(12) United States Patent
Sasaki et al.

(10) Patent No.: US 6,469,288 B1
(45) Date of Patent: Oct. 22, 2002

(54) NEAR FIELD OPTICAL MICROSCOPE AND PROBE FOR NEAR FIELD OPTICAL MICROSCOPE

(75) Inventors: Yasuo Sasaki; Hiroko Sasaki, both of Machida (JP)

(73) Assignee: Olympus Optcial Co., Ltd., Tokyo (JP)

( * ) Notice: Subject to any disclaimer, the term of this patent is extended or adjusted under 35 U.S.C. 154(b) by 0 days.

(21) Appl. No.: 09/571,442

(22) Filed: May 15, 2000

(30) Foreign Application Priority Data

| May 17, 1999 | (JP) | 11-135821 |
| Jun. 10, 1999 | (JP) | 11-163482 |
| Dec. 14, 1999 | (JP) | 11-354417 |
| Apr. 21, 2000 | (JP) | 2000-121198 |

(51) Int. Cl.[7] ............................................. G02B 7/04
(52) U.S. Cl. ................................. 250/201.3; 250/306
(58) Field of Search ........................... 250/201.3, 306, 250/307, 216; 385/32, 8, 43

(56) References Cited

U.S. PATENT DOCUMENTS

| 4,917,462 A | 4/1990 | Lewis et al. | |
| 5,272,330 A | 12/1993 | Betzig et al. | 250/216 |
| 5,664,036 A | * 9/1997 | Islam | 250/306 |

FOREIGN PATENT DOCUMENTS

| EP | 0 801 318 A2 | 10/1997 |
| JP | 62-130302 | 6/1987 |
| JP | 10-170522 | 6/1988 |
| JP | 6-137847 | 5/1994 |

OTHER PUBLICATIONS

N.F. van Hulst, et al., "Near–field optical microscope using a silicon–nitride probe", Appl. Phs. Lett. 62(5), p. 461, 1993 Month Unknown.

S. Kawata, et al., "Near–field scanning optical microscope using a metallic probe tip", The Japan Society of Applied Physics and Related Socieities, preliminary report compilation No. 3, p. 916, Mar. 1995.

S. Kawata, et al., "Near–field Scanning Optical Microscope Using a Metallic Probe Tip", The Japan Society of Applied Physics and Related Societies, preliminary report compilation, No. 3, p. 887, Mar. 1996.

R. Bachelot, et al., "Near–field optical microscope based on local perturbation of a diffraction spot", Opt. Lett. 20, p. 1924, 1995 Month Unknown.

T. Sugiura, et al., "Gold–bead scanning near–field optical microscope with laser–force position control", Opt. Lett. 22, p. 1663, 1997 Month Unknown.

H. Sasaki, et al., "Imaging of refractive index change by the reflection–mode scattering–type scanning near–field optical microscope: Simulation and observations", Journal of Applied Physics, vol. 85, No. 4, pp. 2026–2030, Feb. 15, 1999.

(List continued on next page.)

*Primary Examiner*—Que T. Le
(74) *Attorney, Agent, or Firm*—Scully, Scott, Murphy & Presser

(57) ABSTRACT

A near-field optical microscope comprises an illumination part, a probe, a light detection part, and a scanning part. The illumination part illuminates a sample surface with light. The probe is provided at a position near the sample surface illuminated with the light. The light detection part detects light scattered by the probe. The scanning part scans the sample and a top end of the probe relatively to each, other. The top end of the probe is a top end of an extending part extending in one direction from a body of the probe. In the side of the top end of the extending part, the extending part is at most three times or less as thick as a top end diameter, over a length of a wavelength of the illuminating light. The near-field optical microscope further comprises means for vibrating the probe in a lengthwise direction of the extending part.

29 Claims, 10 Drawing Sheets

OTHER PUBLICATIONS

K.S. Kunz, et al., "The Finite Difference Time Domain Method for Electromagnetics", CRC Press, J. Appl. Phys. 85, pp. 2026–2030, 1999 Month Unknown.

S. Mitsugi, et al., "Numerical Analysis of Tip–shaped Optical Near–Field Heads for Optical Storage by FDTD method" preliminary report compilation No. 30a–ZA–2, p. 1035, Mar. 2000.

* cited by examiner

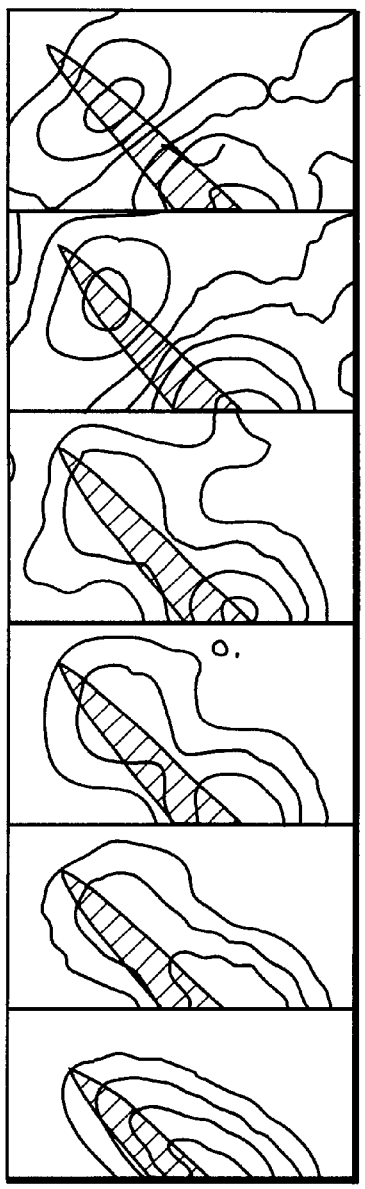
FAR FIELD IMAGES NEAR TOP END OF SILICON CONICAL PROBE AT OPEN ANGLES (HALF ANGLE) 2.5,5,1.5,10,AND12.5 FROM UPSIDE
FIG. 12
FIG. 13  CANTILEVER FOR AFM

NEAR FIELD OPTICAL MICROSCOPE AND PROBE FOR NEAR FIELD OPTICAL MICROSCOPE

CROSS-REFERENCE TO RELATED APPLICATIONS

This application is based upon and claims the benefit of priority from the prior Japanese Patent Applications No. 11-135821, filed May 17, 1999; No. 11-163482, filed Jun. 10, 1999; No. 11-354417, filed Dec. 14, 1999; and No. 2000-121198, filed Apr. 21, 2000, the entire contents of which are incorporated herein by reference.

BACKGROUND OF THE INVENTION

The present invention relates to a near field optical microscope and a probe for the near field optical microscope which detect light scattered by a probe entering into a near field to obtain information concerning the surface of a sample.

A scanning probe microscope (SPM) is a generic name of an apparatus in which, when a probe is set 1 μm or less close to a sample surface, the probe is let scan in the X- and Y-directions or X-, Y-, and Z-directions while detecting a correlative effect caused between both the probe and the sample surface, thereby to carry out two-dimensional mapping of the correlative effect. For example, scanning probe microscopes include a scanning tunneling microscope (STM), an atomic force microscope (AFM), a magnetic force microscope (MFM), and a scanning near-field optical microscope (SNOM).

Among them, developments of the SNOM as an optical microscope having a resolution which exceeds the diffraction limit by detecting near field light formed near a sample has been eagerly promoted after the later half of 1980s to achieve application use for fluorescence measurement of a bionic sample, evaluation of an element (various characteristic evaluations of dielectric light guide paths, measurement of light emission spectrums of semiconductor quantum dots, evaluation of various characteristics of semiconductor laser, etc.).

The SNOM is basically an apparatus which sets a sharp probe near a sample with light illuminated thereon and detects a field (near field) of light near the sample.

The U.S. Pat. No. 5,272,330 granted to Bezig et al. on Dec. 21, 1993 discloses a SNOM in which light is introduced to a probe having a narrowed top end, thereby to generate a field of light localized near a very small opening at the top end of the probe, and this is brought into contact with a sample, to illuminate a very small part of the sample. Transmitted light is detected by an optical detector provided below the sample, and two-dimensional mapping of an intensity of transmitted light is carried out.

The SNOM uses a rod-like probe such as an optical fiber or glass rod which has a top end processed to be narrow or a crystalline probe.

A rod-like probe covered with a metal film except the top end thereof has already been commercially available as an improved type of the probe.

An apparatus using this probe has an improved resolution in the lateral direction in comparison with an apparatus using a probe not coated with metal.

Meanwhile, the AFM has been most widely spread as an apparatus for obtaining topography information of the sample surface among SPMs.

The AFM detects a displacement of a cantilever which shifts in accordance with a force acting on a probe when the prove supported on the top end of the cantilever is set near a sample surface, for example, by an optical displacement sensor, thereby to obtain indirectly information concerning concaves and convexes of the sample surface.

One of the AFMS is disclosed in the Japanese Patent Application KOKAI Publication No. 62-130302.

The technique of measuring concaves and convexes on a sample by detecting a correlative force between the sample and the top end of the probe is utilized for other SPM apparatuses and is used as a means for carrying out so-called regulation.

N. F. van Hulst et al. has proposed a new SNOM which uses an AFM cantilever made of silicon nitride and detects optical information of a sample while measuring concaves and convexes of the sample by AFM measurement, in "Appl. Phs. Lett. 62(5)", P. 461 (1993).

In this apparatus, the sample is set on an internal total reflection prism and the sample is illuminated with a He-Ne laser beam from the total reflection prism side, so the sample is excited and an evanescent optical field is formed near the sample surface.

Subsequently, a probe supported on the top end of the cantilever is inserted in the evanescent optical field, and evanescent light as a localized wave is converted into scattered light as a propagation wave. A part of this light is propagated inside a silicon-nitride-made probe which is substantially transparent with respect to the He-Ne laser beam and passes to the back side of the cantilever.

This light is condensed by a lens provided above the cantilever and enters into a photomultiplier tube through a pinhole provided at a position conjugate with the top end of the probe with respect to the lens. A SNOM signal is outputted from the photomultiplier tube.

While detecting this SNOM signal, displacement of the cantilever is measured by an optical displacement detection sensor. For example, a piezoelectric scanner is subjected to feedback control such that the displacement is maintained at a regulated constant value.

Accordingly, during one scanning, SNOM measurement is carried out based on a scanning signal and a SNOM signal and AFM measurement is carried out based on a scanning signal and a feedback control signal.

In the SNOM of an aperture type disclosed by Betzig et al., the probe should be subjected to metal coating to obtain a high resolution in the lateral direction.

However, it is not easy to manufacture uniformly a large quantity of probes each having an opening at the top end and coated with metal A resolution exceeding a resolution which can be realized by an ordinary optical microscope is required for a SNOM which is expected to have a super resolution. To realize the super resolution, the diameter of the opening at the top end of the probe must be 0.1 μm or less or preferably 0.05 μm or less.

An opening having a diameter of these values is very difficult to prepare with excellent reproductivity.

In addition, since the amount of light which enters into the probe through the opening decreases in proportion to square of the radius of the opening, the light amount to be detected is reduced so that the S/N ratio is deteriorated, if the opening diameter is reduced for the purpose of improving the resolution of an SNOM image in the lateral direction. Thus, there is a problem of trade-off.

Hence, a proposal has been made for a new SNOM (scattering-type) SNOM which uses a feature that high-diffraction dielectric material or metal strongly scatters near-field light without forming an opening at the top end of the probe.

In this SNOM, no opening is required at the top end of the probe so that there is not the problem of trade-off and the difficulty of forming the opening.

Kawata et al. disclose a scattering-type SNOM in the Japanese Patent Application KOKAI Publication No. 6-137847.

In this SNOM, the evanescent light formed on the sample surface is scattered by a needle-like probe and is thereby converted into propagation light. This propagation light, i.e., scattered light is detected by a condenser lens and a photo-detector provided in a side of the probe, and optical information is obtained, based on a detection signal thereof.

Further, Kawata et al. disclose an apparatus in which a metal probe of the STM is used as its probe and propagation light generated due to scattering of evanescent light generated on the sample surface by the top end of the metal prove is observed from the lateral side of the sample and probe while controlling the distance between a sample and the probe by the STM, so STM observation and SNOM observation can be achieved, in "DAI-42-KAI NIHON OHYOH BUTSURIGAKU KANKEI RENGOH KOENKAI (preliminary report compilation No. 3, page 916, March 1995)".

Also, Kawada et al. further reports that the SNOM observation can be achieved even by multiple scattering of propagation light entering obliquely from the upside of the sample, between the top end of a metal probe and a sample, in place of the evanescent light, in "DAI-43-KAI NIHON OHYOH BUTSURIGAKU KANKEI RENGOH KOENKAI (preliminary report compilation No. 3, page 916, March 1996)".

Bachelot et al. also report a scattering-type SNOM depending on propagation light from the upside without using the probe having an opening, in "Opt. Lett. 20 (1995), p. 1924".

Toda et al. disclose a scattering-type SNOM which uses an micro cantilever made of silicon for AFM so as to use a dark field illumination system.

Since an AFM image with a high resolution can be obtained by this AFM cantilever made of silicon and also the diffraction rate is high, the scattering efficiency of light is high so advantages can be obtained for the scattering type SNOM probe.

The scattering type SNOM probe is constructed in a structure in which the probe becomes fatter from the top end toward the bottom portion supporting the probe.

In addition, light is scattered by the part within a range of one wavelength from the top end of the probe.

Therefore, light is scattered not only by the top end of the probe but also by a part which is fatter than the top end.

A signal depending on the scattered light from the fatter part lowers the high-resolution performance of an SNOM image.

Also, since the cantilever made of silicon for AFM described above has a structure in which the probe projects from the top end of a plate-like lever, there is a drawback that scattered light is blocked by the lever part so that the scattered light cannot be used efficiently.

Angular resolution of the scattered light is also a factor important to attain high resolution. The angle which can be used is limited due to the reasons described above.

In addition, in many of existing apparatuses, an objective lens used for both the optical microscopic observation and scattering signal collection is provided above a sample, and therefore, there is a drawback that an apparatus for measurement depending on the angle of scattered light cannot be provided.

In the scattering type near field optical microscope (scattering type SNOM) utilizes a feature that light illuminated on a probe causes strong scattering at the top end portion due to an effect of electric field concentration to a sharp top end of a probe, to illuminate a very small portion of a sample in close contact to the probe with the scattered light. By taking in this light while scanning the sample, an image exceeding the diffraction limit is obtained.

With respect to the shape of the probe, probes for AFM and STM have been conventionally used but attention has not been particularly paid except the condition that the top end is sharp.

A probe for the scattering type SNOM has a structure in which the probe is fatter from the top end toward a portion closer to the base part supporting the top end. Although light is scattered most strongly by the sharp portion at the top end of the probe, the light is also scattered by the part within one wavelength or so from the top end.

Therefore, light is scattered not only by the top end of the probe but also by the part which is fatter than the top end.

A signal depending on the scattered light from the fatter part deteriorates the high-resolution performance of a SNOM image.

Sugiura et al. disclose a SNOM which uses a very small gold globe supported by a laser trap, as a scattering probe, in "Opt. Lett. 22 (1997), P. 1663".

In this SNOM, drawbacks as described above need not be considered but the force of holding the very small gold globe is weak so that imaging takes a very long time.

Also, samples that can be observed are limited because of underwater operation.

BRIEF SUMMARY OF THE INVENTION

The present invention has an object of providing a near-field optical microscope as a SNOM which can obtain a high-resolution SNOM image and can operate in the air be extremely excluding influences from scattered light from portions other than a probe, and the probe for the near-field optical microscope.

Also, the present invention has an object of providing a near-field optical microscope which can detect scattered light over a wider angle range by arranging the structure of a cantilever, and the cantilever for the near-field optical microscope.

To achieve the above objects, according to the present invention, there is provided a near-field optical microscope comprising: an illumination part for illuminating a sample surface with light; a probe provided at a position near the sample surface illuminated with the light; a light detection part for detecting light scattered by the probe; and a scanning part for scanning the sample and a top end of the probe relatively to each other, wherein the top end of the probe is a top end of an extending part extending in one direction from a body of the probe, in a side of the top end of the extending part, the extending part is at most three times or less as thick as a tope end diameter, over a length of a wavelength of the illuminating light, and the near-field optical microscope further comprises means for vibrating the probe in a lengthwise direction of the extending part.

Also, to achieve the above objects, according to the present invention, there is provided a probe used for a near-field optical microscope, comprising: a probe body; and an extending part extending in one direction from the probe body, wherein in a side of a top end of the extending part, the extending part is at most three times or less as thick as a top end diameter, over a length of 700 nm from the top end.

Also, to achieve the above objects, according to the present invention, there is provided a near-field optical microscope comprising: an illumination part for illuminating a sample surface with light; a cantilever having a probe and a probe hold part, with a top end part of the probe positioned near the sample; and an objective optical system for receiving scattered light generated at a top end part of the probe and caused from the illuminating light, wherein the top end part of the probe is in a view field of the objective optical system without being shielded.

Also, to achieve the above objects, according to the present invention, there is provided a cantilever which can be used for a near-field optical microscope, comprising: a hold part extending in one direction; and a probe positioned at an end part of the hold part, wherein a top end of the probe is positioned further outside a top end of the hold part in the direction in which the hold part extends.

Also, to achieve the above object, according to the present invention, there is provided a near-field optical microscope comprising: light illumination means for illuminating a sample surface of a sample with light; a probe having a top end provided at a position near the sample surface which is illuminated with the light; light detection means for detecting scattered light scattered by the probe; and scanning means for scanning the sample and the top end of the probe relatively to each other, wherein a top end diameter of the prove is equal to or smaller than ¼ of a wavelength of the light illuminating the probe, and where a length of a range illuminated with the light from the light illumination means is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $d_{max} \geq d_0(z_0+\lambda/2)/(\lambda/2)$ is given.

Also, to achieve the above object, according to the present invention, there is provided a near-field optical microscope comprising: light illumination means for illuminating a sample surface of a sample with light; a probe having a top end provided at a position near the sample surface which is illuminated with the light; light detection means for detecting scattered light scattered by the probe; and scanning means for scanning the sample and the probe relatively to each other, wherein a top end diameter of the prove is equal to or smaller than ¼ of a wavelength of the light illuminating the probe, and where a length of a detection range of the light detection means is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $d_{max} \leq d_0(z_0+\lambda/2)/(\lambda/2)$ is given.

Also, to achieve the above objects, according to the present invention, there is provided a probe used for a near-field optical microscope, comprising: a probe body; and an extending part extending in one direction from the probe body, wherein a top end diameter of the extending part is equal to or smaller than ¼ of a wavelength of light illuminating the probe, and where a length of a range illuminated with the light from the extending part is $z_0$, the wavelength of the illuminating light is $\lambda$, a maximum value of a diameter of the extending part is $d_{max}$ within a range from a top end of the extending part to a distance $z_0$, and the top end diameter of the extending part is $d_0$, the diameter of the extending part monotonously increases from the top end to the distance $z_0$, and $d_{max} \leq d_0(z_0+\lambda/2)/(\lambda/2)$ is given.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a view showing a result of actually calculating a far field image when light is let illuminate a sharp top end in a scattering type near field optical microscope according to the third embodiment of the present invention.

FIG. 13 is a view showing a cantilever for AFM.

DETAILED DESCRIPTION OF THE INVENTION

Figure 1:
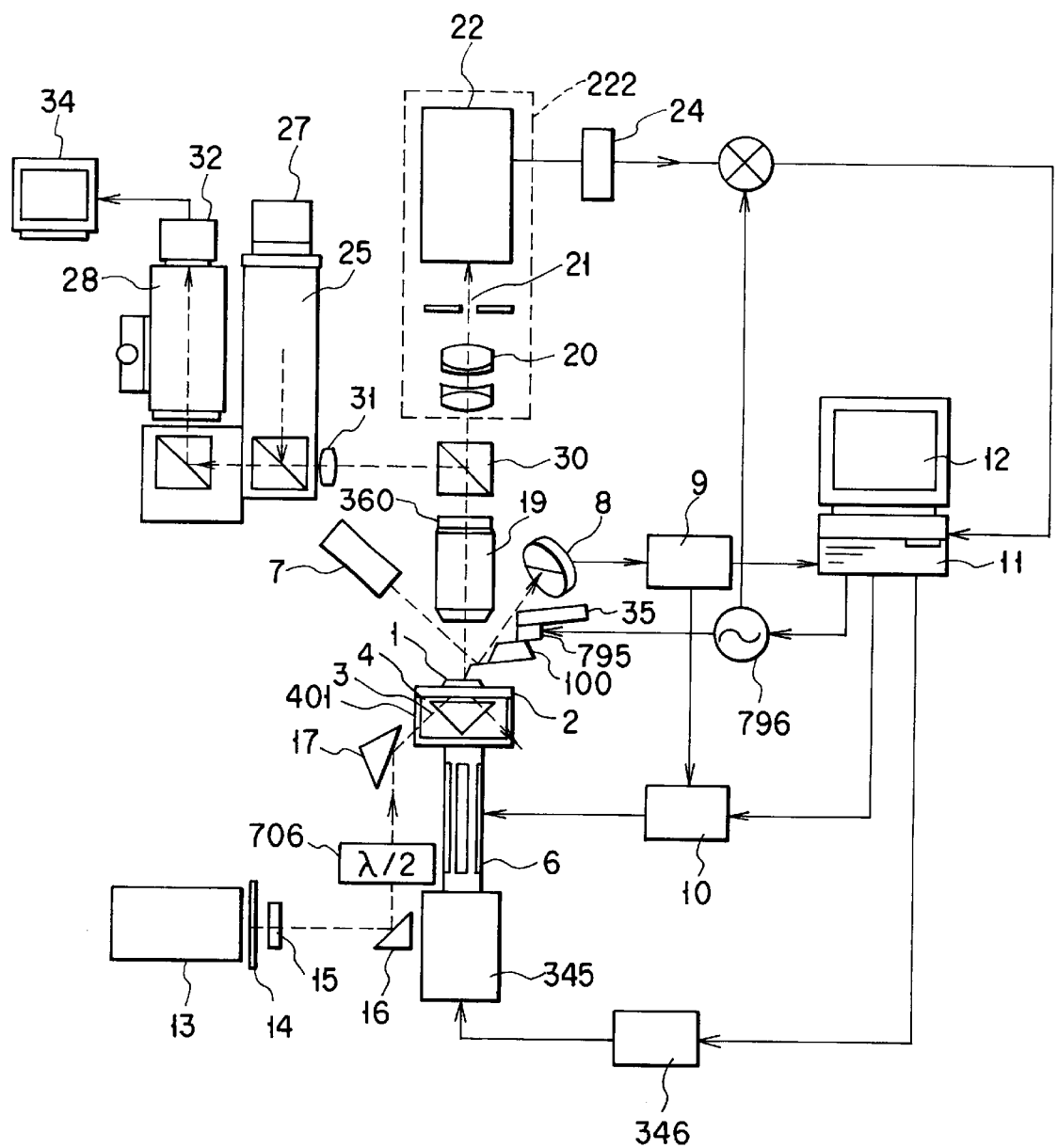
FIG. 1 is a view schematically showing the entire structure of a scattering-type scanning-type near field optical microscope according to the first embodiment of the present invention.

Reference will now be made in detail to the presently preferred embodiments of the invention as illustrated in the accompanying drawings, in which like reference numerals designate like or corresponding parts.

(First Embodiment)

In the following, a scattering type near field optical microscope will be explained with reference to the drawings.

As shown in FIG. 1, the scattering type near field optical microscope has a transparent cantilever tip 100 made of silicon nitride which is provided above a sample 1.

Figure 2:
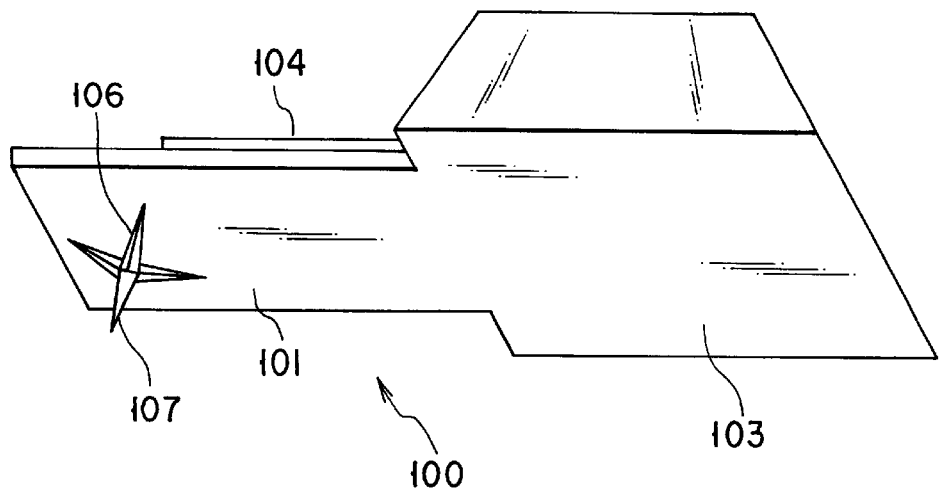
FIG. 2 is a perspective view showing a cantilever tip used for the scanning-type near-field optical microscope shown in FIG. 1.

The cantilever tip 100 has a support part 103, a cantilever 101 extending from the support part 103, and a probe 106, as shown in FIG. 2.

This probe 106 has an extending part 107 like a needle extending in a direction substantially vertical to the surface of the cantilever 101, and a metal coat 108 is provided at the top end part of the extending part.

Although FIG. 1 shows a structure which uses a ZnO whisker having a tetra-pod-like shape, as an example of a probe 106, the structure need not always have a tetra-pod-like shape as long as the top end is constructed to be sharp as indicated as follows.

For example, the probe 106 may be a carbo-nano tube or have a structure whose top end is sharpened by etching or the like.

Also, if the extending part 107 itself is made of material or metal having a high diffractive rate, the metal coat 108 need not be provided.

The extending part 107 has a thickness which is three times as large as the top end diameter over the length of the wavelength of incident light, including the metal coat 108 if the metal coat 108 is provided.

Otherwise, the object can be achieved if the length of the metal coat 108 provided at the top end part of the extending part 107 of the probe 106 is reduced sufficiently in comparison with the wavelength of the incident light.

The reason will be described in details later.

An aluminum film 104 is coated as a high-reflection film on the back surface (opposite to the surface where the probe 106 is provided) of the cantilever 101.

If a part close to the probe 106 of the cantilever 101 is transparent, scattered light generated by the probe 106 is not shut off but is preferably detected, particularly in a structure in which a scattered-light detection optical system is provided above the cantilever 101.

As shown in FIG. 1, the cantilever tip 100 is supported above a sample 1 by a tip hold mechanism 35 through an ultrasonic oscillator 795.

The cantilever tip 100 is vibrated by a high-frequency voltage from a high-frequency power source 796 by the high-frequency power source 796 which drives the ultrasonic oscillator 795 as an optical amplitude modulation means.

The present apparatus has a displacement sensor of an optical lever type which detects displacement of a free end of the cantilever 101, and this displacement sensor has a semiconductor laser 7 which illuminates the cantilever 101 with light and a half-split photodetector 8 which receives reflection light from the cantilever 101.

The laser beam emitted from the semiconductor laser 7 is let illuminate the cantilever 101, reflected by an aluminum film 104 provided on the back surface of the cantilever, and enters into the half-split photodetector 8.

Displacement of a free end of the cantilever 101 causes a change of the incidence position of reflection light with respect to the half-split photodetector 8 and changes the ratio of outputs from light receive parts of the half-split photodetector 8.

Accordingly, the displacement of the free end of the cantilever 101 is obtained by investigating differences between the outputs of the light receive parts of the half-split photodetector 8, so the displacement of the probe 106 is obtained indirectly.

A sample table 401 is fixed to an upper end of tube scanner 6, and an internal total-reflection prism 3 is provided in the inner space of the sample table 401.

The internal total-reflection prism 3 is supported independently from the sample table 401 and is exposed from the opening provided in the center of the upper surface of the sample table 401.

A slide glass 2 where the sample 1 is mounted drips a proper portion of matching oil 4 and is mounted on the sample table 401.

As a result of this, as shown in FIG. 1, the matching oil 4 exists between the slide glass 2 and the internal total-reflection prism 3 so that both of the glass and prism are optically combined together.

A piezoelectric tube scanner 6 is provided on a coarse movable stage 345.

The coarse movable stage 345 is driven by a coarse stage drive circuit 346 controlled by a computer 11 so as to three-dimensionally move coarsely the sample table 401 fixed to the piezoelectric tube scanner 6 and accordingly move the sample 1 mounted thereon.

In this manner, coarse position alignment between the sample and the extending part 107 of the probe 106 is carried out, so the distance between the sample 1 and the probe 106 of the extending part 107 is adjusted coarsely.

The piezoelectric tube scanner 6 is driven by a scanner drive circuit 10 controlled by a control circuit 9 and a computer 11 so as to move the sample table 401 three-dimensionally.

In this manner, the sample 1 on the slide glass 2 mounted on the sample table 401 is three-dimensionally moved relatively to the top end of the extending part 107 of the probe 106.

As a result of this, the top end of the extending part 107 of the probe 106 scans the surface of the sample 1 and the distance between the surfaces of the top end of the sample 1 and the extending part 107 of the probe 106 is adjusted finely.

In the present specification, scanning in which the probe traverses the sample surface is called XY-scanning, and adjustment of the distance between the top end of the probe and the sample surface is called Z-control.

As described above, the internal total-reflection prism 3 is supported independently from the sample table 401, so the internal total-reflection prism 3 is kept unmoved during scanning without being influenced by motion of the sample table 401.

The present apparatus comprises a light generator means for generating light between the probe and the sample.

The light generator means includes a localized light generator means for generating localized light which is not propagated but is localized, and a propagation light generator means for generating propagation light for generating light which is propagated. One of these means is selected in accordance with various characteristics such as the thickness of the sample, material characteristics, and the like.

The localized light means light which does not propagate through a space and is evanescent light, for example.

Propagation light means light which propagates through a space and is normal light, for example.

In the following, the localized light generator means and the propagation light generator means will be specifically described.

The localized light generator means, e.g., an evanescent light generator means particularly in this case includes a laser light source 13, a filter 14, a lens 15, two mirrors 16 and 17, and an internal total-reflection prism 3, in FIG. 1.

For example, an argon laser having an output of 25 mW is used as the laser light source 13.

The mirror 17 is supported by a motion/rotation mechanism not shown such that the position and orientation of this mirror can be changed. In this specification, the mirror 17 is situated as shown in FIG. 1.

A laser beam emitted from the laser light source 13 passes through the filter 14 and is thereafter changed into a plane laser beam by the lens 15.

The plane laser beam is reflected sequentially by the mirrors 16 and 17 and is thereafter reflected totally by the upper surface of the internal total-reflection prism 3 (i.e., the interface between the slide glass 2 and the sample 1 or between the sample 1 and the air).

As a result, evanescent light is generated near the surface of the sample 1.

If necessary, a lens for condensing the plane laser beam may be inserted between the mirror 17 and the internal total-reflection prism 3.

Also, a ½-wavelength plate 706 may be provided rotatably on the light path of the plane laser beam.

Rotation of this ½-wavelength plate 706 changes the polarization direction of the plane laser beam.

Figures 3, 4, 5:
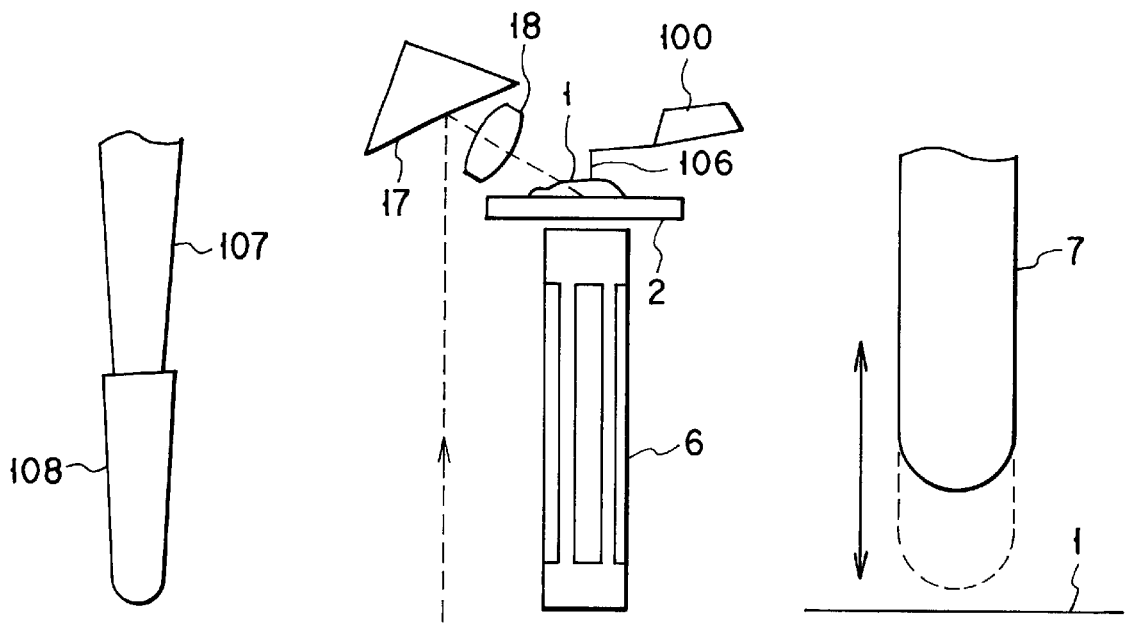
FIG. 3 is an enlarged view showing a top end part of an extending part of a probe of the cantilever tip shown in FIG. 2.
FIG. 4 is a view showing a state where a plane laser beam as propagation light is let illuminate a sample obliquely from upside.
FIG. 5 is a view showing a state where the extending part of a probe vibrates in a direction vertical to the sample surface.

Meanwhile, the propagation light generator means includes a laser light source 13, a filter 14, a lens 15, two mirrors 16 and 17, and a lens 18, in FIGS. 1 and 3.

As described above, the mirror 17 is supported by a motion/rotation mechanism not shown such that the position and orientation of this mirror can be changed. This mirror is situated as shown in FIG. 4 in this case.

The laser beam emitted from the laser light source 13 passes through the filter 14 and is thereafter changed into a plane beam by the lens 15.

The plane laser beam is reflected sequentially by the mirrors 16 and 17 and illuminates the vicinity of the sample and the top end of the extending part 107.

In particular, the plane laser beam is condensed by the lens 18 and illuminates the top end part of the extending part 107 of the probe 106.

The propagation light generator means may also include an optical system using a dark-field illumination system as disclosed in Japanese Patent Application KOKAI Publication No. 8-141752.

As shown in FIG. 1, an objective lens 19 is provided above the internal total-reflection prism 3 with the sample 1 and probe 106 inserted therebetween.

A scattered-light detection tube 222 is provided above the objective lens 19 and operates together with the objective lens thereby constructing a scattered light detection optical system.

The scattered light detection optical system detects scattered light which is generated when the probe enters into evanescent light as localized light.

The scattered light detection tube 222 includes a lens group 20, a pinhole 21, and a photoelectron multiplying tube 22.

The pinhole 21 is provided at a position optically conjugated with the top end of the extending part 107 of the probe 106, and the scattered light detection optical system is a confocal optical system.

Accordingly, most of light that enters into the photoelectronic multiplying tube 22 is scattered light generated near the top end of the extending part 107 of the probe 106.

Thus, the scattered light detection optical system is a confocal optical system and therefore efficiently detects scattered light generated near the top end of the extending part of the probe 106.

The photoelectronic multiplying tube 22 outputs an electric signal corresponding to the light intensity of received scattered light.

A component of an output signal from the photoelectronic multiplying tube 22 that is synchronized with a vibration of a cantilever described above or a high-frequency component of the output signal is selectively received and amplified by a lock-in amplifier 24 and is taken in as a SNOM signal (near-field signal) by the computer 11.

Figure 6:
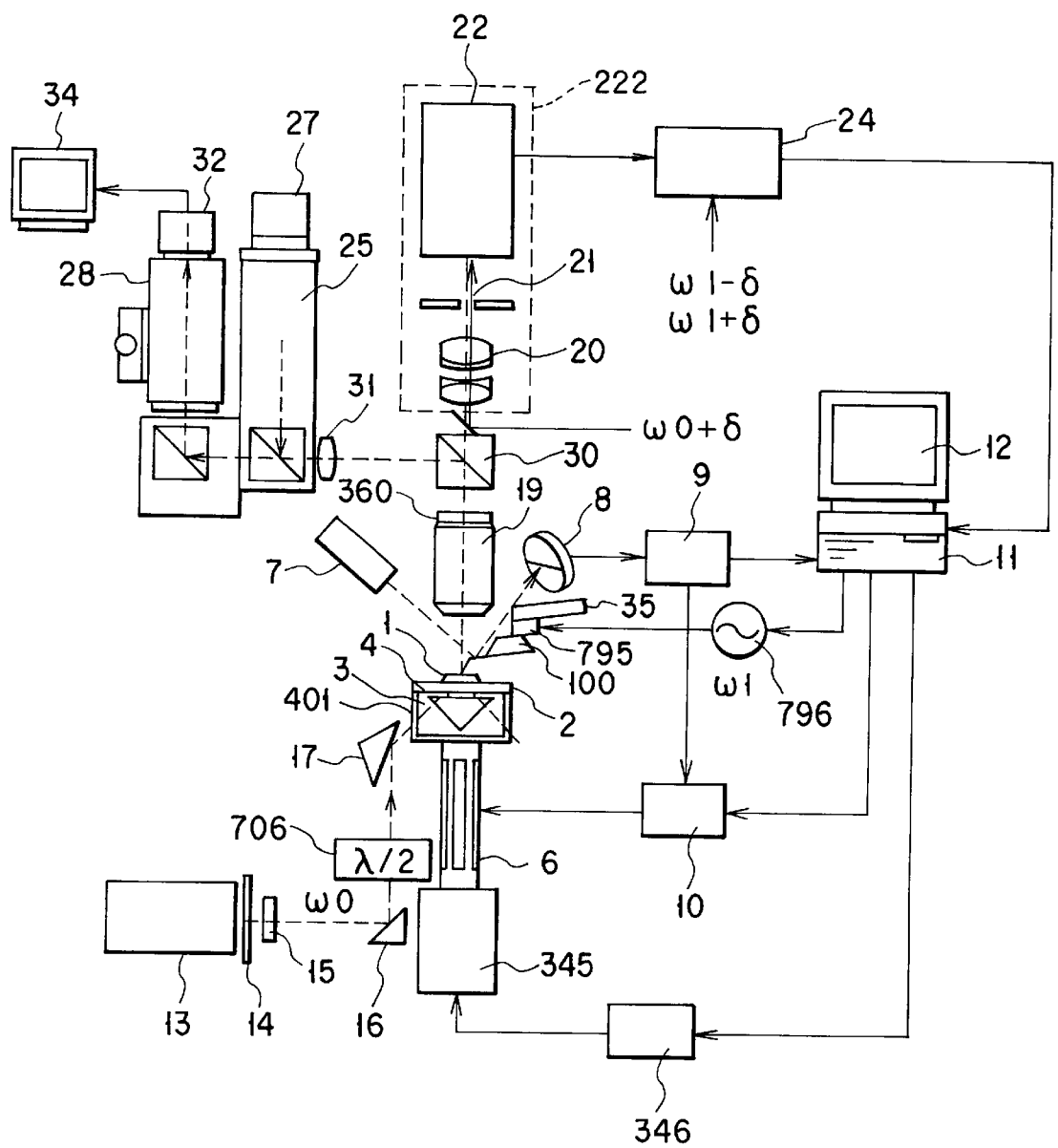
FIG. 6 is a view schematically showing the entire structure of the scattering-type scanning-type near-field optical microscope according to the present invention, using a heterodyne wave detection method.

Also, as shown in FIG. 6, it is possible to use a heterodyne wave detection method in which reference light having a frequency different from the incident light by $\delta$ is let enter into the photoelectronic multiplying tube 22 thereby to cause interference, so that a sum of the frequency and the number of vibrations $\omega_1$ or the frequency $|\omega_1 \pm \delta|$ component is selected and amplified.

The present apparatus has a microscopic ocular tube 28 and a microscopic illumination tube 25, both of which are combined with an objective lens by an half mirror prism 30 provided above the objective lens 19.

The microscopic ocular tube 28 operates together with the objective lens 19 thereby constructing an optical microscope, and the microscopic illumination tube 25 operates together with the objective lens 19 thereby constructing an illumination optical system.

The optical microscope is used for specifying an observation position of the sample 1, positioning the top end of the extending part 107 of the probe 106 to the observation position, and confirming illumination position of the laser light from the displacement sensor to the cantilever 101, in addition to use for various optical observations of the sample 1.

If the observation position and the illumination position of the laser light for the displacement sensor can be confirmed, other measures such as a stereoscopic microscope, a magnifier, and an electronic microscope may be used.

The microscopic ocular tube 28 is equipped with a CCD camera for obtaining an image.

The image obtained by the CCD camera 32 is displayed on a monitor television 34.

The microscopic illumination tube 25 is connected to the illumination light source 27 through an optical fiber 26.

Illumination light generated by the illumination light source 27 illuminates the sample 1 through the microscopic illumination tube 25, lens 31, half-mirror prism 30, and objective lens 19.

Light from the sample 1 enters into the microscopic ocular tube 28 through the objective lens 19, half-mirror prism 30, lens 31, half-mirror prism 370, and mirror prism 371 and forms an image on the light receive surface of the CCD camera 32.

An image obtained by the CCD camera 32 is displayed on the monitor television 34.

In the present apparatus, SNOM measurement and AFM measurement are carried out simultaneously.

That is, SNOM information and AFM information are obtained during one scanning.

The AFM measurement is carried out in a dynamic mode in which a very fine vibration is applied to the cantilever such that the probe vibrates in a direction vertical to the sample surface, for example.

In this dynamic mode, with use of the ultrasonic oscillator 795, the cantilever tip 100 is vibrated such that the top end of the extending part 107 of the probe 106 provided at the top end part of the cantilever 101 vibrates at a constant amplitude in a direction substantially vertical to the surface of the sample 1.

If the top end of the extending part 107 of the probe 106 is set sufficiently close to the surface of the sample 1 (i.e., at a distance at which an atomic force acts), the vibration amplitude of the top end of the extending part 107 of the probe 106 is damped.

While Z-control (control of the probe-sample distance) is carried out such that the damped vibration amplitude of the top end of the extending part 107 of the probe 106 is maintained to be constant, XY-scanning is performed with the top end of the extending part 107 of the probe 106.

While the top end of the extending part 107 scans the sample surface, traversing this surface, Z-control between the top end of the probe and the sample surface is carried out.

This Z-control is achieved by generating a control signal concerning the position in the Z-direction by the control circuit 9 in accordance with the signal from the displacement sensor and by controlling the piezoelectric tube scanner 6 by the scanner drive circuit 10 on the basis of the control signal.

During the scanning, the control signal generated from the control circuit 9 for Z-control is taken in as AFM information by the computer 11 and processed together with the XY-scanning signal generated inside the computer.

In this manner, an AFM image expressing convexes and concaves of the sample surface is formed.

Also, during the scanning, the output signal from the photoelectronic multiplying tube 22 is taken in as SNOM information (near-field information) by the computer 11 and is processed as an XY-scanning signal generated inside the computer 11.

In this manner, a SNOM image expressing optical information concerning the sample surface is formed.

The AFM image and the SNOM image are displayed together on the monitor 12.

The preferable shape of the probe in the near-field optical microscope explained above will now be explained below.

In the near-field microscope described above, the extending part vibrates up and down as shown in FIG. 5 and the illumination range of incident light does not falls within the range of vibration of the tip but the extending part above the range of vibration is illuminated.

At this time, there will be no problem if the extending part has a rod-like shape. However, if the extending part has a tapered shape whose apex is oriented downward, the amount of light scattered by the oblique surface part of the tapered shape changes in accordance with the up and down motion of the extending part and generates a noise component which obstructs observation.

To prevent the generation of this noise, the shape of the extending part should preferably be a shape close to a rod.

More preferably, the part from the portion near the top end of the rod to the illumination range should have a substantially constant thickness.

In this structure, the broadness of the illumination range does not differ between up and down vibrations of the extending part 107 of the probe 106, except for the part indicated with a broken line in FIG. 5.

Also, since the scattering occurs at a region equivalent to a wavelength or so from the top end, the thickness may be constant within the region of the wavelength or so.

In this case, the S/N can be improved by selecting only the signal from the portion near the top end by reducing the pinhole diameter.

However, if the extending part does not have a substantially constant thickness, a probe which can be manufactured more easily can be used in practical use.

It will be sufficient for the shape of the extending part of the probe that the thickness is three times or less as large as the top end diameter at least over the length equivalent to the wavelength of incident light.

Under these conditions, it is possible to manufacture easily a probe with noise reduced excellently.

Although it will be difficult to manufacture a probe, it is possible to obtain more preferable performance if the thickness is twice or less as large as the top end diameter at most, at least over the length equal to or longer than the wavelength of incident light.

Suppose now that the top end diameter is defined as follows.

That is, a virtual cone having a triangular cross-section having an apex angle of 90° is supposed, and this virtual cone is oriented downward such that the apex of the virtual cone and the apex of the top end part of the probe are made correspond to each other.

At this time, an intersection line between the oblique surface of the virtual cone and the surface of the probe forms a closed curve such as a substantial circle or the like, and twice averaged distance from the centroid of the closed curve is defined as the top end diameter.

For example, if it is supposed that light of 488 nm of an argon laser is adopted as a wavelength of representative incident light, the above-described condition that the top end side of the extending part should be at most three times or less as large as the top end diameter over the length equal to or longer than the wavelength of the incident light can be said in other words that the top end side of the extending part is at most three times or less as large as the top end diameter over the length of 488 nm or more.

Also, in case of using light of 633 nm from a helium neon laser, the condition is that the length is 633 nm from the top end.

Further, supposing the case of using various incident light, it is possible to respond to incident light over a wide range if the condition that the thickness should be at most three times or less as large as the top end diameter over the length of about 700 nm or more from the top end in consideration of the wavelength range of incident light is satisfied.

As a method of thus preparing an extending part, for example, growing process of the whisker is stopped halfway and the top end must be intentionally sharpened, if a ZnO whisker having a tetra-pod-like shape is used to prepare an extending part.

Although there is a problem of yield, the top end of the extending part having a sharp top end is brought into contact with another object thereby to remove the top end.

However, noise cannot be avoided even in this case. If the illumination range is larger than the wavelength, a structure which does not involve a scattering source but causes a smooth change will be rather preferable in consideration of the S/N.

Most preferable is a probe which has a thickness substantially equal to the top end diameter within the illumination range and has a smooth structure and which simultaneously has a smooth structure in which the top end of the extending part is at most three times or less as large as the top end diameter at least over the length equal to or longer than the wavelength of the incident light.

As a method of wave detection of a signal, lock-in wave detection described above will be cited. In the lock-in wave detection, only the scattering signal from the portion indicated by a broken line in FIG. 5 is selectively picked up, and therefore, a SNOM image having a high resolution.

However, in the lock-in wave detection method, a drawback still remains in that a signal and other noise components from an upper portion of the probe and cross terms with the scattering signal at the exactly top end of the probe cannot be removed since the light intensity is detected on the photoelectronic multiplying tube.

If a heterodyne wave detection method is used as disclosed in Japanese Patent Application KOKAI Publication No. 10-170522, the drawback is eliminated and the S/N can be improved.

Also, the object can be achieved if the length of a metal coat 108 provided at the top end part of the extending part 107 of the probe 106 is sufficiently small compared with the wavelength.

For example, the length of the metal coat 108 may be 50 nm or less. This is because the diffraction rate of metal is high. If attention is paid to this part, it can be considered as if metal fine grains vibrated, and influences from the other portion of the extending part are reduced.

It is possible to use a structure in which gold fine grains in place of a metal coat stick to the top end of the extending part 107.

In this case, the diameter of the gold fine grains should preferably be 50 nm or less.

The scattering efficiency of the metal coat 108 is much greater than that of the extending part if the extending part is a material whose reflection rate is relatively small. Therefore, the metal coat part can be regarded as independent metal fine grains which are not substantially supported.

A SNOM image having a high resolution can be obtained by vibrating the extending part 107 of this probe 106 in a direction substantially vertical to the sample surface and picking up a component synchronized with the number of vibrations.

This is proved by a calculation result taught in a thesis "J. Appl. Phys. 85 (1999), pp. 2026–2030" by H. Sasaki et al.

Further, by dipping the extending part 107 in a liquid having a reflection rate similar to that of the extending part, conditions become closer to those described in the thesis so that a SNOM image having a high resolution can be obtained.

A first embodiment according to the present invention is not limited to the embodiment described above but includes all embodiments that can be carried out without deviating from the scope of the invention.

Therefore, according to the first embodiment of the present invention, the probe has an extending part extending in one direction and has a thickness which is at most twice or less as large as the top end diameter over the length equal to or longer than incident light from the top end. It is therefore possible to provide a SNOM in which influences from scattered light from other portions than the top end of the probe are extremely excluded and which can operate in the air.

That is, according to the first embodiment of the present invention, influences from scattered light from other portions than the top end of the probe are excluded extremely, so that it is possible to obtain a high-resolution SNOM image, a near-field optical microscope as a SNOM which can operate in the air, and a probe for a near-field optical microscope as the probe of the near-field optical microscope.

(Second Embodiment)

Figure 7:
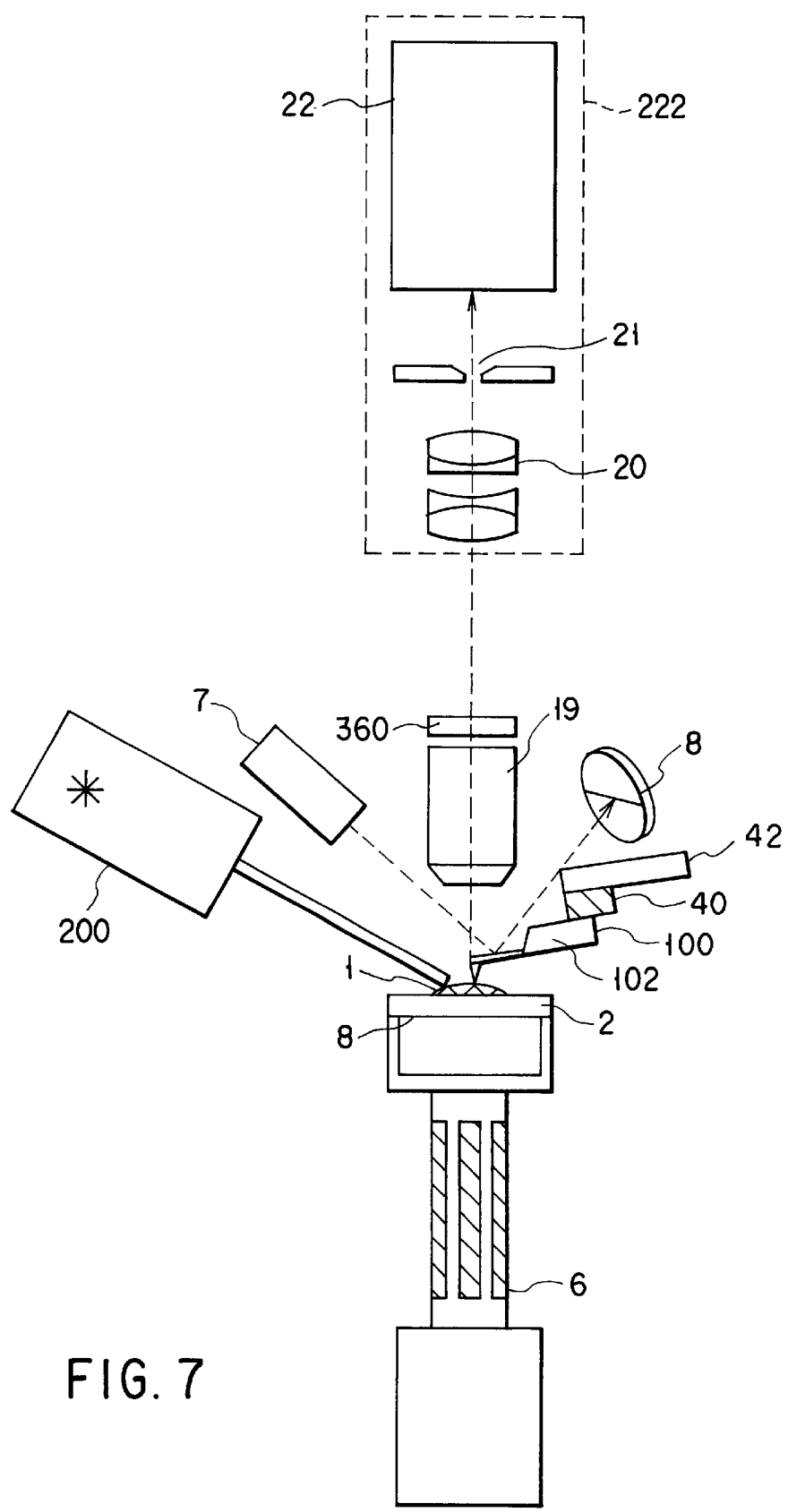
FIG. 7 is a view showing a schematic structure of a near-field optical microscope according to the second embodiment.

FIG. 7 shows a schematic apparatus structure of a near-field optical microscope according to the second embodiment of the present invention.

The present apparatus has a structure based on an atomic force microscope (AFM) as shown in FIG. 7.

In FIG. 7, the scattering probe 100 forming part of a cantilever is attached to a probe hold part 102 having a free end.

The methods including a method of detecting displacement of the free end of the probe hold part 102, a method of scanning a sample 1, and light illumination means are the same as the measurement methods in a normal scattering type SNOM. (See H. Sasaki and Y. Sasaki, J. Apl. Phys. 85,2026 (1999)).

Light from a laser light source 200 enters into a sample 1 and a probe 100 and is scattered by the top end of the probe.

This scattered light is detected by an optical detector 22 in a scattered-light detection tube 222 through an objective lens 19.

In this case, the light from the laser light source 200 may be arranged such that polarization is controlled by a polarizer or the like not shown before the light is let illuminate the sample 1.

Also, the light condensed by the objective lens 19 can be detected with only an arbitrary polarization component extracted by an analyzer 360.

The scattered light detection tube 222 includes a lens group 20, a pinhole 21, and a photoelectronic multiplying tube 22 as a light detector.

The pinhole 21 is set on the optically conjugate position to the top end of the probe 100 with respect to the objective lens 19 and the lens group 20 (wherein a certain surface of the pinhole 21 serves as an image forming surface).

Therefore, this structure is arranged such that other components than the scattered light generated near the top end of the probe 100 (i.e., light scattered by other portions than the sample surface and the probe) can be removed by the pinhole 21.

Also, the photoelectronic multiplying tube 22 outputs an electric signal corresponding to the intensity of received light.

A similar effect can be obtained if the end surface of the fiber in place of the pinhole is situated at the position of the pinhole.

In this case, the near-field signal is detected by the photoelectric multiplying tube 22 through an optical fiber.

Further, a near-field optical image can be obtained by detecting the scattered light while scanning is carried out with the distance maintained between the sample 1 and the top end of the probe 100.

Although there is a method in which measurement is made while cyclically modulating the distance between the sample 1 and the probe 100, the average distance is maintained constant in this case.

The distance between the sample 1 and the probe 100 will be described later.

Figure 8A:
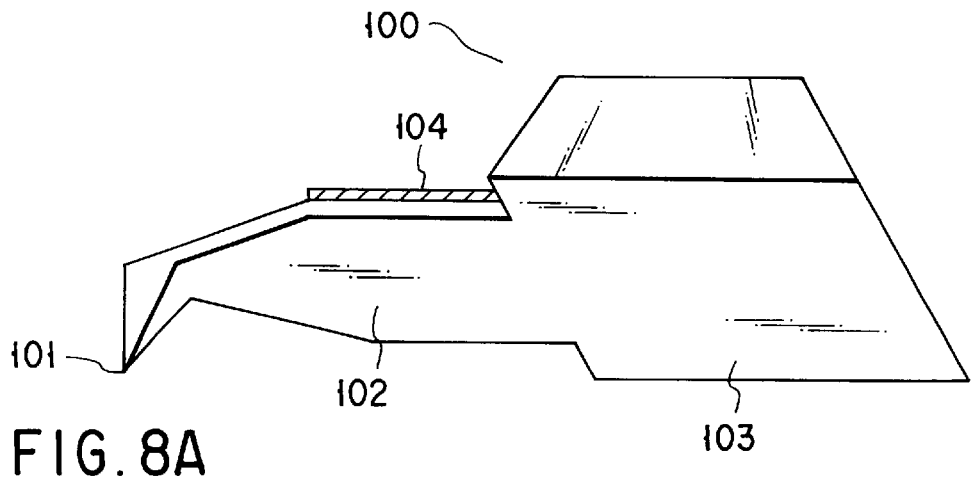
FIGS. 8A and 8B are views schematically showing the structure of a probe 100 of a scattering-type near field optical microscope according to the second embodiment of the present invention.
Figure 8B:
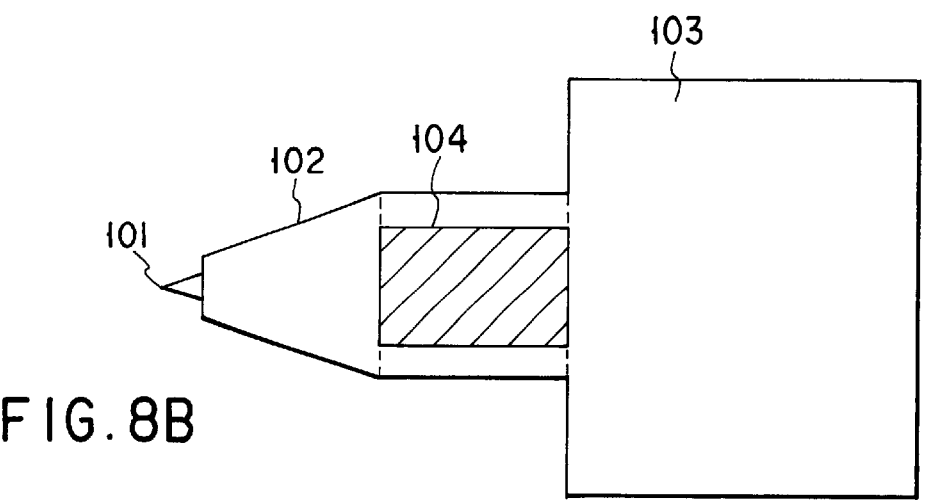

FIGS. 8A and 8B show a structure of the probe 100 of the scattering type near field optical microscope according to the present embodiment.

That is, the probe 100 of the scattering type near field optical microscope according to the present embodiment has a probe hold part 102 having a hold table 103 as a fixed end, as shown in FIG. 8A, e.g., a cantilever structure.

A metal film 104 is coated on the back surface of the probe hold part 102 in order to measure a relative distance between the probe 100 and a sample.

Aluminum and metal are used for this coating in many cases.

Further, the relative distance between the probe 100 and the sample can be measured, for example, based on the principle of optical lever.

In the case of this optical lever, light from the semiconductor laser 7 as shown in FIG. 7 is let illuminate the back surface of the probe 100.

Since high-reflection metal is coated on the back surface of the probe 100, light thus illuminating from the semiconductor laser is reflected efficiently and enters into a half-split detector.

Further, as the probe hold part 102 is displaced in upward and downward directions with respect to the sample, the difference between light amounts detected by the half-split detector 8 changes so that the relative distance between the sample 1 and the probe 100 can be measured.

Here, the top end diameter of the probe 101 is a size equal to or smaller than the wavelength of the light from the laser light source 200, and the top end of the probe 101 functions as a scattering member or a light emission member.

This probe 101 may be formed of high-refraction dielectric material, metal, or light emitting material or may be coated by these materials.

In any cases, the probe 101 scatters light upon illumination with light or emits luminescence upon absorption of light.

In this case, as long as the radius of the top end part is smaller than the wavelength of light from the laser light source 200, the probe 101 may have a structure in which the length from the top end to the contact surface with the bottom part and the size on the contact surface are equal to or longer than the wavelength of the laser light source 200.

Also, the top end of the probe is constructed in a structure in which the top end projects out of the free end of the cantilever, as shown in FIG. 8B, when viewed from the upper part of the cantilever.

By this structure, scattered light can be detected efficiently as will be described next.

Figure 9A:
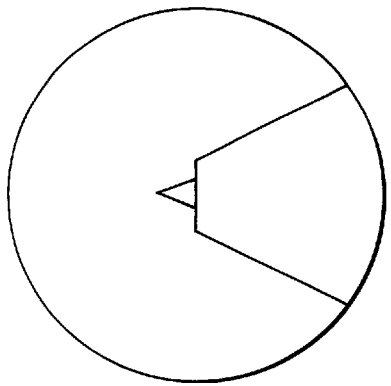
FIGS. 9A and 9B are views schematically showing an area which can be detected by opening of an objective lens of the scattering-type near field optical microscope according to the second embodiment of the present invention.
Figure 9B:
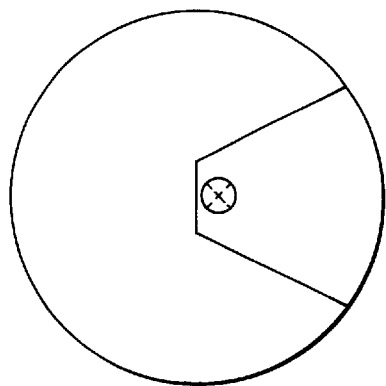

FIGS. 9A and 9B schematically show a region which can be detected by the objective lens 3.

In FIG. 9A, the top end of the probe 101 projects out of the free end of the probe hold part 102.

At this time, light scattered by the top end of the probe 101 can be condensed by the objective lens 3.

Meanwhile, in FIG. 9B, the top end of the probe 101 is hidden inside the free end of the probe hold part 102.

At this time, the light scattered by the top end of the probe 101 is hidden by the probe hold part 102 and therefore cannot be condensed by the opening of the objective lens 3.

Accordingly, in near-field detection of the scattering type, a necessary requirement is that the top end of the probe 101 should have a structure in which the top end projects out of the free end of the cantilever, as shown in FIG. 8B.

At this time, the detection amount of the scattering signal increases depending on the exposure degree with respect to the probe hold part 102 of the top end of the probe 101. That is, the detection amount by an objective lens having an equal opening increases as the hidden part becomes smaller.

FIGS. 10A to 10D show a structure of the probe 100 according to a modification example of the second embodiment according to the present invention.

Figure 10A:
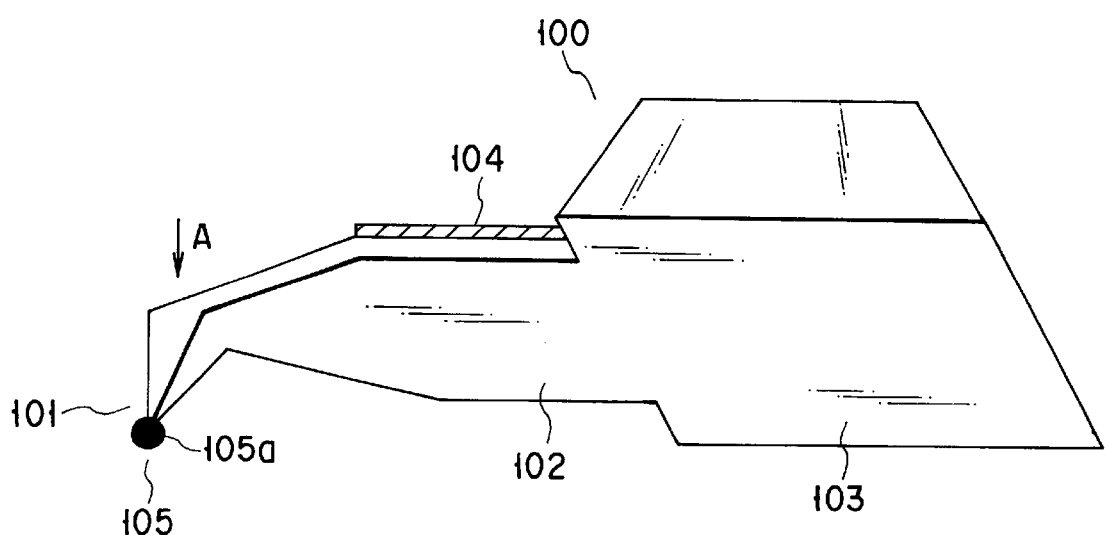
FIGS. 10A and 10C are views showing the structure of a probe 100 according to a modification of the second embodiment of the present invention.
Figure 10B:
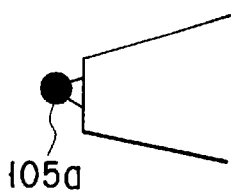
FIGS. 10B and 10D are views indicated with arrows in FIGS. 10A and 10C.

That is, as shown in FIGS. 10A and 10B, the top end of the probe 101 need not be directly exposed outward from the free end of the probe hold part 102.

For example, a very small scattering ball 105a as shown in FIG. 10A and a very small scattering member 105b as shown in FIG. 10B may be provided as scattering members having a very small size equal to or smaller than the wavelength of light from the laser light source 2 and may be situated outside the free end of the probe hold part 102.

For example, the very small scattering ball 105a as shown in FIG. 10A is a gold colloid grain or a polystyrene bead.

Figure 10D:
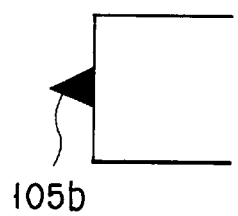
Figure 10C:
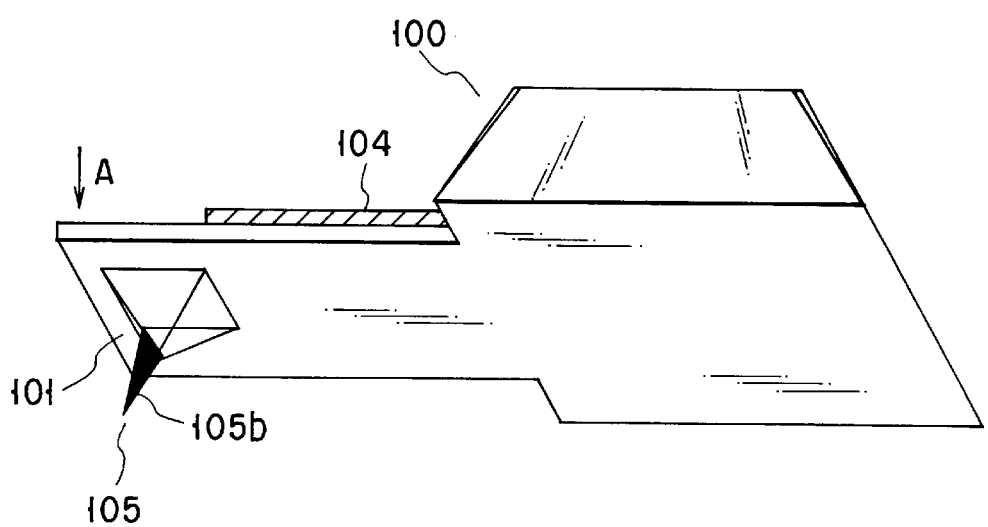

Also, a very small scattering ball 105a as shown in FIGS. 10C and 10D is a carbon deposit deposited on the top end of the probe 101.

These very small structural members as described above themselves may be of scattering material or may be coated with high-scattering material.

For example, the high-scattering material is gold or the like.

FIGS. 11A to 11D show a structure of the probe 100 according to another modification example of the second embodiment of the present invention.

That is, in the probe 100 according to another modification example of the second embodiment, a very small structural member is provided at the top end of the probe 101 as described in the modification example described above.

Figure 11A:
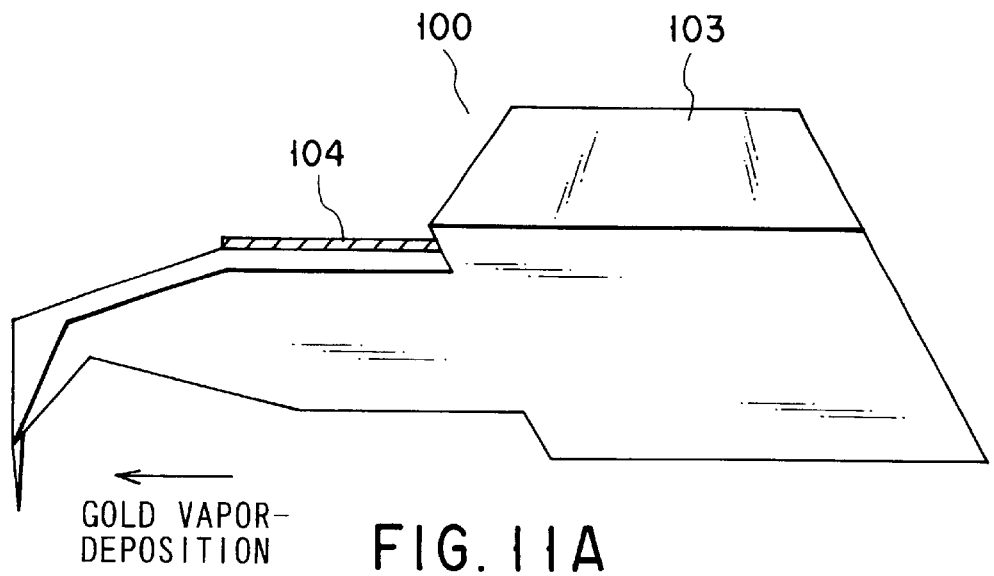
FIGS. 11A, 11B, 11C, and 11D are views showing the structure of a probe 100 according to another modification of the second embodiment of the present invention.
Figure 11B:
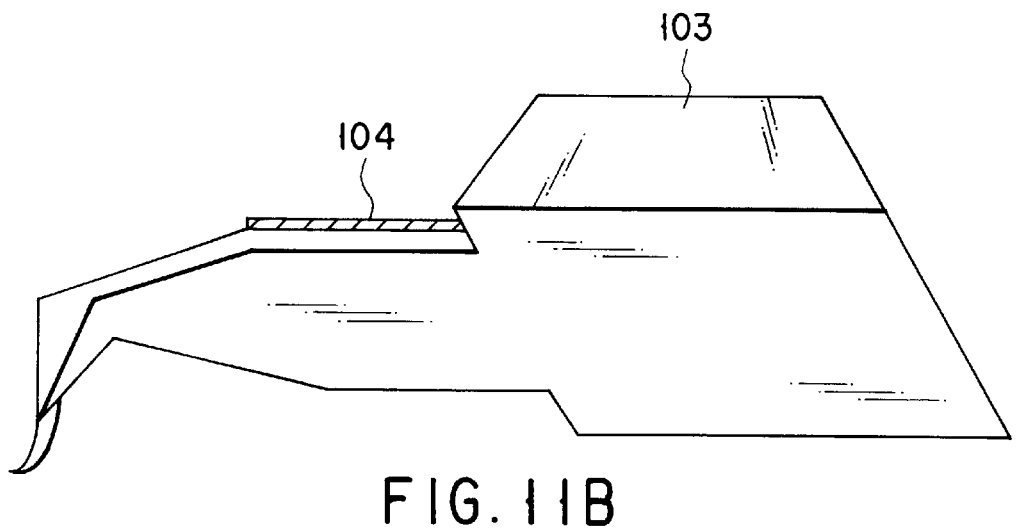
Figures 11C, 11D:
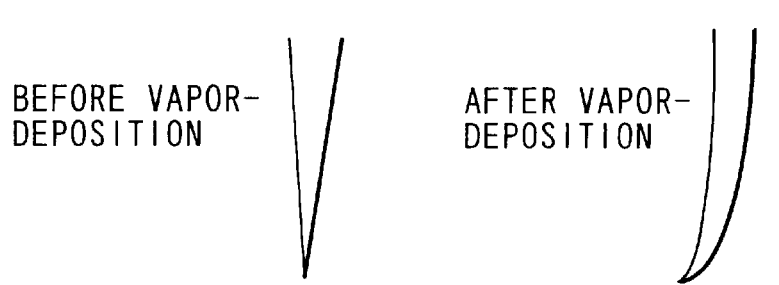

When the top end of the very small structural member is positioned inside the free end of the probe hold part 102 when observed from upside as shown in FIG. 10A, the very small structural member is warped due to a stress of a thin film so that the top end of the probe hold part 102 is situated out of the free end, by coating a high-scattering material from the direction of the probe hold part 102, as shown in FIGS. 11B, 11C, and 11D.

Here, with respect to the thickness of the coating, the structural member is warped as shown in FIGS. 11B, 11C, and 11D, and the top end is exposed to the outside of the free end of the probe hold part 102, when gold is coated to be about several tens nm thick in case of a carbon deposit which has a length of 3 $\mu$ and a base end having a diameter of 100 to 200 nm, although depending on the elasticity of the very small structural member.

In this case, the warp of the very small structural member is enlarged in proportion to the thickness of gold to be coated. However, since the top end diameter of the very small structure is enlarged in some cases, the warp should preferably be set within a warp range within which a sufficient scattering efficiency can be obtained and a resolution of the top end diameter does not hinder the resolution to be achieved.

Also, a probe 100 according to further another modification example of the second embodiment is arranged to have a probe structure in which a carbon deposit is selectively deposited on the top end of the probe 101 in the electronic microscope, as the very small structural member at the top end of the probe 101 of the probe 100 according to the previous another modification example of the second embodiment described above.

In case of a carbon deposit, the scattering efficiency is low so that it is necessary to coat a high-scattering material such as gold or aluminum.

Therefore, as described above, according to the second embodiment of the present invention, it is possible to provide a near-field optical microscope which can detect scattered light over a much wider angle range by arranging the structure of the cantilever.

Also, according to the second embodiment of the present invention, it is possible to provide a cantilever which can detect scattered light over a much wider angle range by arranging the structure of the cantilever.

(Third Embodiment)

In the following, explanation will be made of a scattering probe for a scattering type near field optical microscope according to a third embodiment of the present invention and a near-field optical microscope using the same, with reference to the drawings.

In the scattering probe for a scattering type near field optical microscope according to the third embodiment of the present invention and the near-field optical microscope using the same, the thickness d of the probe, the top end diameter $d_0$ of the probe, and the maximum value $d_{max}$ of the diameter of the probe will be defined as follows, with reference to FIG. 15.

Figure 15:
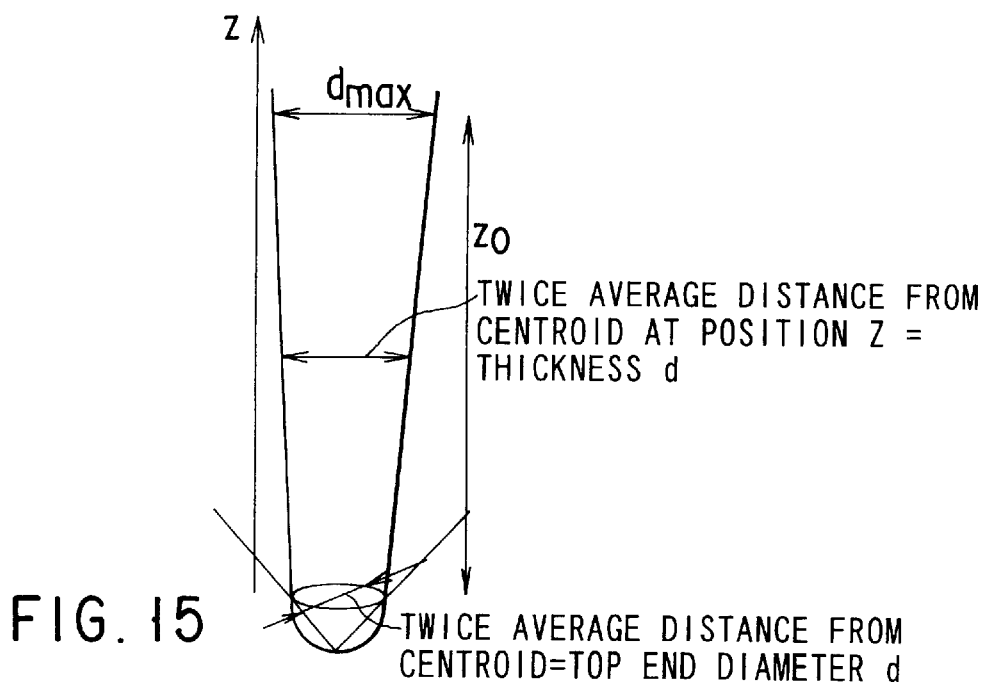
FIG. 15 is a view for explaining definitions of a thickness d of a probe, a top end diameter $d_0$ of the probe, and a maximum value $d_{max}$ of a diameter of the probe in a scattering type near field optical microscope according to the third embodiment of the present invention.

That is, as shown in FIG. 15, supposing a virtual cone which has a triangular cross-section having an apex angle of 90°, the apex of the virtual cone is oriented right downwards and the apex of the virtual cone and top end part of the probe oriented right downward are let correspond to each other.

At this time, an intersection line between the oblique surface of the virtual cone and the surface of the probe forms a closed curve like a substantial circle, and twice the average distance from the centroid of the closed curve is defined as the top end diameter of the probe.

The thickness d of the probe is defined as twice the average distance between centroid and the closed curve formed by the boundary of the cross-section at the position z.

The maximum value of the diameter of the probe within the range from the top end of the probe to the distance $z_0$ is defined as $d_{max}$.

Meanwhile, as described above, the scattering type near field optical microscope (scattering type SNOM) utilizes the feature that light illuminating a probe causes strong scattering at the top end part due to an effect of electric field concentration to the top end of the sharp probe, thereby to illuminate a very small part of a sample set near the probe by the scattered light. By taking in this light while scanning the sample, an image exceeding a diffraction limit is obtained.

Attention has not conventionally been paid to the shape of the probe except that the top ends of the probes are sharp and usually probes for the AFM and STM are used.

However, with respect to the shape of the probe, it has been found by simulations that a smaller top end diameter is not always better but a better probe is determined by the opening angle at the top end of the probe or the top end diameter should be greater than a certain value.

This relationship will be expressed by a simple expression as follows.

If the top end diameter of the probe is expressed as $d_0$ (where $d_0$ is smaller than ¼ wavelength), the thickness d of the probe at a portion closer to the base end by z from the top end along the axis must be as follows.

$$d \geq d0\ (z+\lambda/2)/(\lambda/2) \tag{a}$$

In this expression, where the inequality is replaced with an equation, the shape is a cone having an opening angle (half angle) θ which satisfies the following expression.

$$\tan\theta = d_0/(\lambda/2) \tag{b}$$

The shape appears as if the part having a thickness $d_0$ or less is removed from the top end of the cone.

Therefore, if the top end diameter has been determined, the thickness $d_0$ of the top end of the probe in the expression (a) must be narrower than a cone having an opening angle θ determined by the expression (b). Inversely, if the opening angle θ has been determined, the thickness $d_0$ of the top end of the probe must be thicker than the cone having an opening angle θ determined by the expression (b).

This expression of relationship is cleared by simulations according to a FDTD method.

By the FDTD method (see H. Sasaki et al., J. Appl. Phys. 85 (1999), pp. 2026–2030 and Kunz et al. "Finite Difference Time Domain Method for Electrodynamizs" CRC Press), it is possible to calculate a state of an electric field around an object and a far field image (which shows how a scattered portion is observed by microscopic observation) when light and radio waves are scattered by the object.

Conventionally, with respect to a scattering type probe, it has been considered that strong scattered light is obtained at the top end by an electric field concentration effect at a sharp top end. However, actual strength of scattered light observed by the far field depends on not only the strength of a concentrated electric field but also on the volume contributing to scattering.

Hence, FIG. 12 shows a result where a far field image is actually calculated when a sharp top end is illuminated with light.

FIG. 12 shows far field images (contours lines) of a conical probe where the top end diameter is 0 and the opening angle (half angle) is changed to 2.5, 5, 7.5, 10, 12.5, and 15 in the order from the uppermost side, in FIG. 7.

These far field images show conditions of the top end scattering when the scattered light is observed by a microscope.

The hatching line portions show the positions of the conical probe in FIG. 7, respectively. In the far field images, the portion which illuminates most strongly is a portion slightly deep from the top end without relating the electric field concentration to the most top end.

This position is $\lambda/2$ as far as the opening angle does not exceed 15°.

Accordingly, if a probe sharpened more than the probe described above is used, the position which illuminates most strongly is situated deeper than the top end.

Where the position which illuminates most strongly is the center of the light source, the probe illuminates the sample from a position slightly distant from the sample even if the probe contacts the sample, so the resolution is deteriorated as a result.

Accordingly, a probe having a shape cut out near the position which illuminates most strongly or a deeper position is regarded as having a most strong portion when the probe is viewed as a far field image, so that an image reflecting the top end diameter of the probe is obtained.

The relationship between the distance z from the top end and the thickness d of the conical probe from which a part of $z_1$ from the top end is cut out is as follow.

$$d=d_0 z_1 \cdot (z_1+z)$$

Where $z_1=\lambda/2$ is substituted in this expression, the following is given.

$$d=d_0/(\lambda/2) \sim ((\lambda/2)+z)$$

Since the part can be cut out at a much thicker portion, the following is given.

$$\leq d_0/(\lambda/2) \cdot ((\lambda/2)+z)$$

Since the volume is more important for scattering than the shape, the shape need not always be limited to a cone as long as the shape is gradually thicker from the top end monotonously.

These relational expressions can be applied when the opening angle is smaller than 15°.

In this case, the inclination is $d0/2/(\lambda/2) \leq \tan 15°$ and is therefore about 0.27.

Accordingly, d0 is substantially $\lambda/4$ or less.

Also, it is natural that this condition is within the illumination range of the illumination light or within a range of the detection part.

When light having a wavelength of $\lambda$ is made illuminate the top end of the probe from the lateral direction, the light is considered as spreading to the extent of $1.22\lambda/(2NA)$ as a Rayleigh criterion.

In this case, NA is a numerical aperture of the condenser lens.

When light is let enter from a direction of the angle $\theta$ from a surface perpendicular to the axis of the scattering probe or from the sample surface if the scattering probe is substantially perpendicular to the sample, the range of $1.22/(2NA\cos\theta)$ is given.

When light enters in a confocal arrangement from a substantially perpendicular direction, the illumination range is determined by the pinhole diameter and the lens.

Since the wavelength is about 500 nm in a visible light of probe, a variegation diameter of the incident light is $1.22\lambda/(2NA)$ using the Rayleigh criterion. In case of the oblique incident light, as NA is 0.2 at the most, the range of the incident light to the probe is 1.5 $\mu$m. Accordingly, the top end of diameter of the probe is 125 nm less as ¼ of the wavelength, the thickness of the probe is gradually thicker from the top end along the axis of the probe monotonously. In the range of $z_0=1.5$ $\mu$m, if the maximum value $d_{max}$ of the thickness of the probe satisfies the following expression it is possible to obtain a high-resolution probe for a near-field optical microscope.

$$d_{max} \leq d_0(z_0+\lambda 2)/(\lambda/2)$$

In case of evanescent illumination, the illumination area changes depending on the incidence angle to the sample surface. However, the condition described above must be satisfied at least over the range of $\lambda$ or more.

The same thing as described above applies to the sensitivity range of a detection system, depending on the optical system to be used.

It is necessary that the above condition is satisfied with within a range of either the illumination system or the detection system.

Although it is most preferred that the sensitivity ranges of both systems are satisfied, an effect can be expected to some extent if the above condition is satisfied by either one sensitivity range.

For example, in case of the later system, the illumination system is a small NA optical system which adopts oblique incidence and the detection system is a large NA optical system which adopts a confocal system from the vertical direction.

Since the sensitivity range of the illumination system is broad, the greatest effect is obtained if this condition is satisfied.

Meanwhile, an effect can be also expected to some extent if the condition is satisfied by only the sensitivity range of the detection system.

In the above, it has been described that if the shape is arranged such that the cone of the probe is cut out at a position distant by $\lambda/2$ from the top end of the cone, scattered light is caused at the top end of the probe so that the shape is most preferable for a probe for a scattering type near field optical microscope.

However, if the probe is cut out at a position closer to the top end than the position distant by $\lambda/2$, scattered light is not caused at the top end of the probe so that the resolution is deteriorated.

As the cut-out position is shifted closer to the position distant by $\lambda/4$ from the top end from the position distant by $\lambda/2$, the resolution is deteriorated to 1.5 times greater than the resolution in case where the probe is cut out at the position distant by $\lambda/2$. However, since scattered light is caused near the top end of the probe as long as the cut-out position is within the range of the position distant by $\lambda/4$, an effect similar to that obtained in case where the probe is cut out at the position distant by $\lambda/2$.

Where the probe is cut out at the position distant by $\lambda/4$ from the top end, the relationship between the top end diameter $d_0$ of the probe, the distance z from the top end, and the diameter of the probe with respect to the wavelength $\lambda$ of the incident light is as follows.

$$d=d_0(z+\lambda/4)/(\lambda/4)$$

Figure 16:
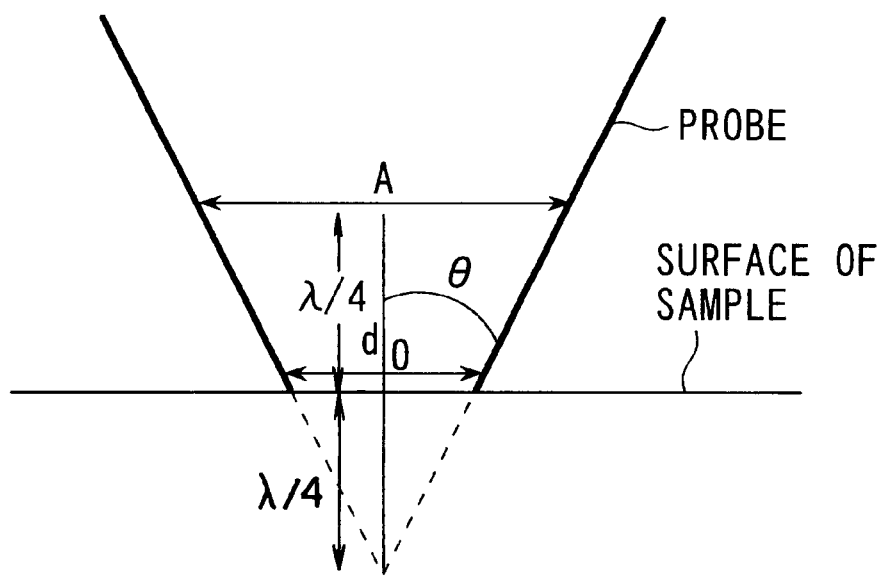
FIG. 16 is a cross-sectional view showing the top end part of the probe when this relationship is satisfied.

FIG. 16 is a cross-sectional view showing the top end part of the probe when this relationship is satisfied.

As shown in FIG. 16, the center of the scattering is positioned at a distance of $\lambda/4$ from the top end of the probe.

If the prove is cut out up this position, the resolution is improved most, so that the incident light is scattered at the diameter A at the top end and enters into the sample.

Actually, it can be considered that the sample is illuminated from the part having a thickness A at the height of $\lambda/4$ from the top end of the probe. Therefore, the resolution is deteriorated more than the case where the probe is cut out at the position distant by $\lambda/2$.

Figure 17:
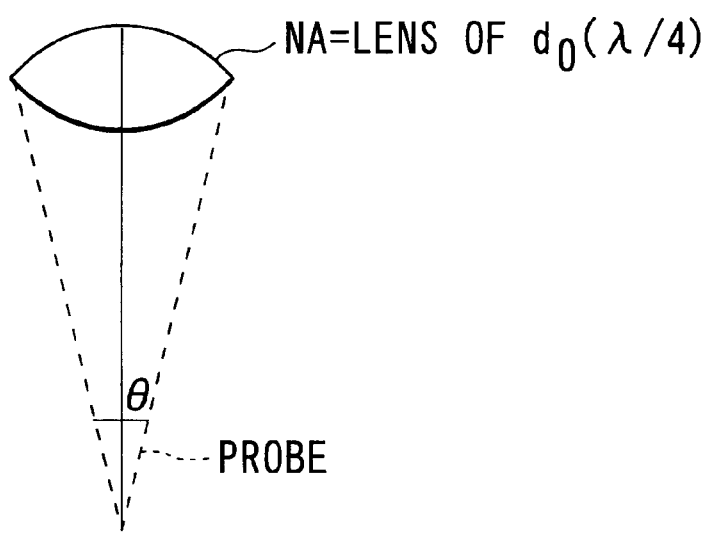
FIG. 17 shows a relationship between the NA of the lens which condenses scattered light and the opening angle θ of the cone.

FIG. 17 shows a relationship between the NA of the lens which condenses scattered light and the opening angle $\theta$ of the cone.

As the NA of the lens set right above the probe is larger, scattered light which obliquely enters into the sample is more taken in by the lens, so the resolution is deteriorated.

Accordingly, a smaller NA is better.

However, if the probe is perpendicular to the sample, it is necessary that the opening angle (half angle) of the lens is larger than the opening angle $\theta$ of the probe in order to condense scattered light from the sample by the lens.

If the opening angle (half angle) of the lens is equal to or smaller than the opening angle $\theta$, scattered light is shielded by the probe and therefore cannot be condensed.

That is, it is necessary to satisfy $NA \leq d_0/(\lambda/4)$.

In case of using a lens which satisfies $NA = d0/(\lambda/4)$ which provides the highest resolution, the component of the scattered light which spreads at the opening angle $\theta$ of the cone of the probe is condensed.

Since the condensed component is scattered light from the sample surface which is just 1.5 times as large as the thickness A of the probe at the height of $\lambda/4$ from the probe, the resolution is 1.5 times deteriorated.

Accordingly, the resolution is 1.5 times or less deteriorated so that an effect close to that in case of cut-out at the optimal position distant by $\lambda/2$, if the following relationship is satisfied.

$$d \leq d_0(z+\lambda 4)/(\lambda/4)$$

Also, like in the description made previously, a similar effect can be obtained if the following relation is satisfied.

$$d_{max} \leq d_0(z_0+\lambda/4)/(\lambda/4)$$

A probe having this shape can be realized in the method as follows.

Needle-like crystal is let grow or bonded on a proper substrate.

Since this is too sharp generally, the top end is polished to a desired thickness by a method of scanning a sample having a coarse surface or the like.

If an electron beam is kept irradiated on the substrate in a vacuumed chamber, carbon as a component of an oil of a vacuum pump is deposited thereby forming a narrow structure (EBD tip).

Also in this case, the top end is narrowed generally. Therefore, an electron beam is irradiated while carrying out fine scanning, or a formed narrow structure is polished to obtain a desired thickness.

Otherwise, another material may be deposited.

Further, the tip can be prepared by etching and thereafter sharpening a semiconductor or the like. In this case, the structure can be integrally formed together with the substrate.

In this case, a fibre top end, a micro cantilever top end, or the like can be considered as the substrate.

As shown in FIG. 13, when attached to the top end of a cantilever for AFM having a triangular conical probe at its tail end, there is a merit that scattered light can be condensed by an objective lens for observation provided right above (see an embodiment in which the tip is attached to a scattering type SNOM described later).

Since the EBD tip can be prepared to be narrower than required by the condition, a desired tip can be completed by vapor-depositing a high-scattering-efficiency material such as metal or the like around the tip while rotating the tip.

In this case, there is a merit that a prove with a higher scattering efficiency than a base material can be prepared.

However, there is a problem that the tip becomes fat if the entire circumference is coated. Therefore, if a high-scattering efficiency material such as metal or the like is vapor-deposited from one side, a rod-like structure of a high-scattering-efficiency material is supported by a rod-like structure of a low-scattering-efficiency material.

In this case, it is necessary to select a material having high strength which can support the high-scattering-efficiency material.

Figure 14:
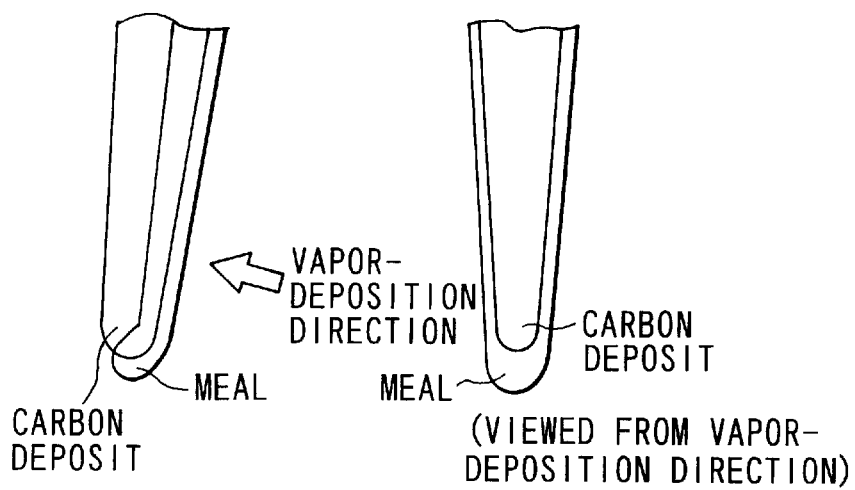
FIG. 14 is a view showing that the structure is arranged such that a rod-like structure of a high-scattering-efficiency material is supported by a rod-like structure of a low-scattering-efficiency material when a high-scattering-efficiency material such as metal or the like is vapor-deposited from one direction, and in this case, the contact portion with a sample becomes a carbon deposit by performing vapor-deposition from a slightly downward direction.

As shown in FIG. 14, it is possible to prevent a contact portion which contacts the sample from being made of a carbon deposit, by vapor-deposition from a slightly downward direction.

Since the carbon deposit has a high hardness and a much lower scattering efficiency than metal such as gold, a combination of the carbon deposit and metal is very suitable for the condition.

In the following, explanation will be made of a third embodiment of a scattering type SNOM which uses a probe as described above. However, since the third embodiment has a structure similar to that shown in FIGS. 1 to 6 according to the first embodiment, only the portions that are different from that shown in these figures will be explained below.

At first, as shown in FIG. 3, a metal coat 108 is provided at the top end part of the extending part 107. Suppose that the part of this metal coat 108 satisfies the condition necessary for the scattering probe according to the third embodiment.

As another preparation method, a narrow rod-like structure made of a carbon deposit is formed at the top end of the cantilever, and metal or the like is vapor-deposited or sputtered thereon from one direction, thereby to form the structure according to the condition described above on a side surface of the first structure.

In this case, the carbon deposit can form a very narrow long structure. The structure as described above can be prepared by performing vapor-deposition thereon to obtain a proper film thickness.

Here, in consideration of a simplest case, the scattering efficiency is considered by an expression of Rayleigh scattering although the scattering efficiency changes depending on the material and size.

The scattering efficiency is then expressed by the following.

$$p_0^2 = a^6 \left| \frac{n^2-1}{n^2+1} \right|^2$$

In the above expression, a denotes the radius of a fine grain and n denotes the diffraction rate.

Taken into consideration only the dependency on the material, a semiconductor (silicon, n=4.32, k=0.07) and gold (n=0.50, k=0.92) respectively have five and twenty times higher scattering efficiencies than glass used for fibres or the like.

Accordingly, by arranging the structure such that these kinds of materials are made stick to a material having a higher scattering efficiency such as a carbon deposit or needle-like crystal, the strength of the structure is guaranteed by the carbon deposit or the like, and the scattering efficiency is guaranteed by metal or the like.

Consequently, in case of the structure in which a material having a high scattering efficiency is made stick from one side, the diameter of the entire probe is thickened and cannot be narrowed if a material having a high scattering efficiency is made stick to the entire surface of a material having a low scattering efficiency.

Hence, if a carbon deposit is selected and metal such as gold is selected as a material having a high scattering efficiency, it appears as if a gold probe solely existed because the scattering efficiency of the carbon deposit is much smaller than that of gold. As a result, it is possible to realize a probe having a structure in which the diameter is entirely small.

Also, since the carbon deposit has sufficient hardness compared with metal, this structure can be maintained.

Therefore, as described above, according to the third embodiment of the present invention, the probe has an extending part extending in one direction, and the thickness thereof is limited depending on the top end diameter. Therefore, by extremely excluding influences from scattered light from other portions than the probe, it is possible to obtain a high-resolution SNOM image and to provide a near-field optical microscope as a SNOM which can operate in the air.

Also, according to the third embodiment, the probe has an extending part extending in one direction, and the thickness thereof is limited depending on the top end diameter. Therefore, by extremely excluding influences from scattered light from other portions than the top end of the probe, it is possible to obtain a high-resolution SNOM image and to provide a probe for a near-field optical microscope as a probe for a near-field optical microscope for a SNOM which can operate in the air.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A near-field optical microscope comprising:
   a light illumination part for illuminating a sample surface of a sample with light;
   a probe having a top end provided at a position near the sample surface which is illuminated with light;
   a light detection part for detecting scattered light scattered by the probe; and
   a scanning part for scanning the sample and the top end of the probe relatively to each other, wherein a top end diameter of the probe is equal to or smaller than ¼ of a wavelength of the light illuminating the probe, and
   where a length of a range illuminated with the light from the light illumination part is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $$d_{max} \leq d_0(z_0 + \lambda/2)/(\lambda/2)$$

is given.

2. A near-field optical microscope comprising:
   a light illumination part for illuminating a sample surface of a sample with light;
   a probe having a top end provided at a position near the sample surface which is illuminated with light;
   a light detection part for detecting scattered light scattered by the probe; and
   a scanning part for scanning the sample and the top end of the probe relatively to each other, wherein
   a top end diameter of the probe is equal to or smaller than ¼ of a wavelength of the light illuminating the probe, and
   where a length of a detection range of the light detection part is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $$d_{max} \leq d_0(z_0 + \lambda/2)/(\lambda/2)$$

is given.

3. A probe used for a near-field optical microscope, comprising:
   a probe body; and
   an extending part extending in one direction from the probe body, wherein
   a top end diameter of the extending part is equal to or smaller than ¼ of a wavelength of light illuminating the probe, and
   where a length of a range illuminated with the light from the extending part is $z_0$, the wavelength of the illuminating light is $\lambda$, a maximum value of a diameter of the extending part is $d_{max}$ within a range from a top end of the extending part to a distance $z_0$, and the top end diameter of the extending part is $d_0$, the diameter of the extending part monotonously increases from the top end to the distance $z_0$, and $$d_{max} \leq d_0(z_0 + \lambda/2)/(\lambda/2)$$

is given.

4. A probe used for a near-field optical microscope, comprising:
   a probe body; and
   an extending part extending in one direction from the probe body, wherein
   a top end diameter of the extending part is equal to or smaller than ¼ of a wavelength of light illuminating the probe, and
   where a length of a sensitivity range of a light detector of the probe is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $$d_{max} \leq d_0(z + \lambda/2)/(\lambda/2)$$

is given.

5. A near-field optical microscope comprising:
   an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe, wherein a top end diameter of the probe is equal to or smaller than ¼ of a wavelength of the light illuminating the probe, and where a length of a range illuminated with the light from the illumination part is $z_0$, the wavelength of the illuminating light is $\lambda$, and the top end diameter of the probe is $d_0$, a diameter d of the probe at a distance from the top end, z, monotonously increases from the top end to the distance $z_0$, and $$d \leq d_0(z+\lambda/2)/(\lambda/2)$$

is given.

6. A near-field optical microscope comprising:

an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe relatively to each other, wherein a top end diameter of the probe is equal to or smaller than ¼ of a wavelength of the light illuminating the probe, and where a length of a detection range of the light detection part of the probe is $z_0$, the wavelength of the illuminating light is $\lambda$, and the top end diameter of the probe is $d_0$, a diameter d of the probe at a distance from the top end, Z, monotonously increases from the top end to the distance $z_0$, and $$d \leq d(z_0+\lambda/2)/(\lambda/2)$$

is given.

7. A probe used for a near-field optical microscope, comprising:

a probe body; and an extending part extending in one direction from the probe body, wherein a top end diameter of the extending part is equal to or smaller than ¼ of a wavelength of light illuminating the probe, and where a length of a range illuminated with the light of the probe is $z_0$, the wavelength of the illuminating light is $\lambda$, a diameter of the probe within a range from a top end of the extending part to a distance $z_0$ is d, and the top end diameter of the extending part is $d_0$, the diameter d of the probe at a distance from the top end, Z, monotonously increases from the top end to the distance $z_0$, and $$d \leq d_0(z+\lambda/2)/(\lambda/2)$$

is given.

8. A probe used for a near-field optical microscope, comprising:

a probe body; and an extending part extending in one direction from the probe body, wherein a top end diameter of the extending part is equal to or smaller than ¼ of a wavelength of light illuminating the probe, and where a length of a sensitivity range of a light detector of the probe is $z_0$, the wavelength of the illuminating light is $\lambda$, a maximum value of a diameter of the extending part within a range from a top end of the extending part to a distance $z_0$ is $d_{max}$, and the top end diameter of the extending part is $d_0$, the diameter d of the probe at a distance from the top end, Z, monotonously increases from the top end to the distance $z_0$, and $$d \leq d_0(z+\lambda/2)/(\lambda/2)$$

is given.

9. A probe used for a near-field optical microscope, comprising:

a probe body; and an extending part extending in one direction from the probe body, wherein a top end diameter $d_0$ of the extending part is 125 nm or less, and a diameter d of the probe monotonously increases within a range from the top end to a distance $z_0=1.5$ $\mu$m and a maximum value $d_{max}$ of the diameter of the extending part satisfies $$d_{max} \leq d_0(z_0+\lambda/2)/(\lambda/2).$$

10. A probe used for a near-field optical microscope, comprising:

a probe body; and an extending part extending in one direction from the probe body, wherein a top end diameter $d_0$ of the extending part is 125 nm or less, and a diameter d of the probe monotonously increases within a range from the top end to a distance $z_0=1.5$ $\lambda$m and the diameter d of the extending part at a distance from the top end, Z, satisfies $$d \leq d_0(z+\lambda/2)/(\lambda 2).$$

11. A near-field optical microscope comprising:

an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe relatively to each other, wherein a top end diameter of the probe is equal to or smaller than ¼ of a wavelength of the light illuminating the probe, and where a length of a range illuminated with the light from the illumination part of the probe is $z_0$, the wavelength of the illuminating light is $\lambda$, a maximum value of a diameter of the probe is $d_{max}$ within a range from the top end of the probe to the distance $z_0$, and the top end diameter of the probe is $d_0$, the diameter of the probe monotonously increases from the top end of the distance $z_0$, and $$d_{max} \leq d_0(z_0+\lambda 4)/(\lambda/4)$$

is given.

12. A near-field optical microscope comprising:

an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe relatively to each other, wherein a top end diameter of the prove is equal to or smaller than ¼ of a wavelength of the light illuminating the probe, and where a length of a detection range of the light detection part of the probe is $z_0$, the wavelength of the illuminating light is $\lambda$, a maximum value of a diameter of the probe is $d_{max}$ within a range from the top end of the probe to the distance $z_0$, and the top end diameter of the probe is $d_0$, the diameter of the probe monotonously increases from the top end to the distance $z_0$, and $$d_{max} \leq d_0(z_0+\lambda/4)/(\lambda/4)$$

is given.

13. A probe used for a near-field optical microscope, comprising:

a probe body; and an extending part extending in one direction from the probe body, wherein a top end diameter $d_0$ of the extending part is equal to or smaller than ¼ of a wavelength of light illuminating the probe, and where a length of a range illuminated with the light from the probe is $z_0$, the wavelength of the illuminating light is $\lambda$, a maximum value of a diameter of the extending part is $d_{max}$ within a range from a top end of the extending part to the distance $z_0$, and the top end diameter of the probe is $d_0$, the diameter of the extending part monotonously increases from the top end to the distance $z_0$, and $$d_{max} \leq d_0(z_0+\lambda/4)/(\lambda/4)$$

is given.

14. A probe used for a near-field optical microscope, comprising:

a probe body; and an extending part extending in one direction from the probe body, wherein a top end diameter $d_0$ of the extending part is equal to or smaller than ¼ of a wavelength of light illuminating the probe, and where a length of a sensitivity range of a light detector of the extending part is $z_0$, the wavelength of the illuminating light is $\lambda$, a maximum value of a diameter of the extending part is $d_{max}$ within a range from a top end of the extending part to the distance $z_0$, and the top end diameter of the probe is $d_0$, the diameter of the extending part monotonously increases from the top end to the distance $z_0$, and $$d_{max} \leq d_0(z_0+\lambda/4)/(\lambda/4)$$

is given.

15. A near-field optical microscope comprising:

an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe relatively to each other, wherein a top end diameter of the probe is equal to or smaller than ¼ of a wavelength of the light illuminating the probe, and where a length of a range illuminated with the light from the illumination part of the probe is $z_0$, the wavelength of the illuminating light is $\lambda$, the top end diameter of the probe is $d_0$, and the diameter d of the probe at a distance from the top end of the probe, Z, monotonously increases from the top end of the probe to the distance $z_0$, and $$d \leq d_0(z+\lambda/4)/(\lambda/4)$$

is given.

16. A near-field optical microscope comprising:

an illumination part for illuminating a sample surface of a sample with light;

a probe having a top end provided at a position near the sample surface which is illuminated with light;

a light detection part for detecting scattered light scattered by the probe; and a scanning part for scanning the sample and the top end of the probe relatively to each other, wherein a top end diameter of the prove is equal to or smaller than ¼ of a wavelength of the light illuminating the probe, and where a length of a detection range of the light detection part of the probe is $z_0$, the wavelength of the illuminating light is $\lambda$, the top end diameter of the probe is $d_0$, and the diameter d of the probe at a distance from the top end of the probe, Z, monotonously increases from the top end of the probe to the distance $z_0$, and $$d \leq d_0(z+\lambda/4)/(\lambda/4)$$

is given.

17. A probe used for a near-field optical microscope, comprising:

a probe body; and an extending part extending in one direction from the probe body, wherein a top end diameter of the extending part is equal to or smaller than ¼ of a wavelength of light illuminating the probe, and where a length of a range illuminated with the light from the extending part is $z_0$, the wavelength of the illuminating light is $\lambda$, a diameter of the extending part is d within a range from a top end of the extending part to the distance $z_0$, the top end diameter of the extending part is $d_0$, and the diameter d of the extending part at a distance from the top end of the probe, Z, monotonously increases from the top end to the distance $z_0$, and $$d \leq d_0(z+\lambda/4)/(\lambda/4)$$

is given.

18. A probe used for a near-field optical microscope, comprising:
a probe body; and
an extending part extending in one direction from the probe body, wherein
a top end diameter of the extending part is equal to or smaller than ¼ of a wavelength of light illuminating the probe, and
where a length of a sensitivity range of a light detector of the extending part is $z_0$, the wavelength of the illuminating light is $\lambda$, a diameter of the extending part is d within a range from a top end of the extending part to the distance $z_0$, the top end diameter of the extending part is $d_0$, and the diameter d of the extending part at a distance from the top end of the probe, Z, monotonously increases from the top end to the distance $z_0$, and $$d \leq d_0(z+\lambda/4)/(\lambda/4)$$

is given.

19. A probe for near-field optical microscope, according to one of claims 10, 13, 14, 17, and 18, wherein the extending part is made of a carbon deposit.

20. A probe for a near-field optical microscope, according to one of claims 3, 4, 7 to 10, 13, 14, 17, and 18, wherein the extending part is made of metal.

21. A probe for a near-field optical microscope, according to one of claims 3, 4, 7 to 10, 13, 14, 17, and 18, wherein the extending part is made of two kinds of materials respectively having different scattering efficiencies and has a structure in which a material having a high scattering efficiency sticks to and around a material having a low scattering efficiency.

22. A near-field optical microscope comprising:
light illumination means for illuminating a sample surface of a sample with light;
a probe having a top end provided at a position near the sample surface which is illuminated with the light;
light detection means for detecting scattered light scattered by the probe; and
scanning means for scanning the sample and the top end of the probe relatively to each other, wherein
a top end diameter of the probe is equal to or smaller than ¼ of a wavelength of the light illuminating the probe, and
where a length of a range illuminated with the light from the light illumination means is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $$d_{max} \leq d_0(z_0+\lambda/2)/(\lambda/2)$$

is given.

23. A near-field optical microscope comprising:
light illumination means for illuminating a sample surface of a sample with light;
a probe having a top end provided at a position near the sample surface which is illuminated with the light;
light detection means for detecting scattered light scattered by the probe; and
scanning means for scanning the sample and the probe relatively to each other, wherein
a top end diameter of the probe is equal to or smaller than ¼ of a wavelength of the light illuminating the probe, and
where a length of a detection range of the light detection means is $z_0$, the wavelength of the illuminating light is $\lambda$, a maximum value of a diameter of the probe is $d_{max}$ within a range from a top end of the probe to a distance $z_0$, and the top end diameter of the probe is $d_0$, the diameter of the probe monotonously increases from the top end to the distance $z_0$, and $$d_{max} \leq d_0(z_0+\lambda/2)/(\lambda/2)$$

is given.

24. A near-field optical microscope comprising:
light illumination means for illuminating a sample surface of a sample with light;
a probe having a top end provided at a position near the sample surface which is illuminated with the light;
light detection means for detecting scattered light scattered by the probe; and
scanning means for scanning the sample and the top end of the probe relatively to each other, wherein
a top end diameter of the probe is equal to or smaller than ¼ of a wavelength of the light illuminating the probe, and
where a length of a range illuminated with the light from the illumination means is $z_0$, the wavelength of the illuminating light is $\lambda$, and the top end diameter of the probe is $d_0$, a diameter d of the probe at a distance from the top end, Z, monotonously increases from the top end to the distance $z_0$, and $$d \leq d_0(z+\lambda/2)/(\lambda/2)$$

is given.

25. A near-field optical microscope comprising:
light illumination means for illuminating a sample surface of a sample with light;
a probe having a top end provided at a position near the sample surface which is illuminated with the light;
light detection means for detecting scattered light scattered by the probe; and
scanning means for scanning the sample and the top end of the probe relatively to each other, wherein
a top end diameter of the probe is equal to or smaller than ¼ of a wavelength of the light illuminating the probe, and
where a length of a detection range of the light detection means of the probe is $z_0$, the wavelength of the illuminating light is $\lambda$, and the top end diameter of the probe is $d_0$, a diameter d of the probe at a distance from the top end, Z, monotonously increases from the top end to the distance $z_0$, and $$d \leq d_0(z+\lambda/2)/(\lambda/2)$$

is given.

26. A near-field optical microscope comprising:
light illumination means for illuminating a sample surface of a sample with light;
a probe having a top end provided at a position near the sample surface which is illuminated with the light;
light detection means for detecting scattered light scattered by the probe; and scanning means for scanning the sample and the top end of the probe relatively to each other, wherein a top end diameter of the probe is equal to or smaller than ¼ of a wavelength of the light illuminating the probe, and where a length of a range of the probe which is illuminated with the light from the illumination means is $z_0$, the wavelength of the illuminating light is $\lambda$, a maximum value of a diameter of the probe is $d_{max}$ within a range from the top end of the probe to the distance $z_0$, and the top end diameter of the probe is $d_0$, a diameter of the probe monotonously increases from the top end to the distance $z_0$, and $$d_{max} \leq d_0(z_0+\lambda/4)/(\lambda/4)$$

is given.

27. A near-field optical microscope comprising:

light illumination means for illuminating a sample surface of a sample with light;

a probe having a top end provided at a position near the sample surface which is illuminated with the light;

light detection means for detecting scattered light scattered by the probe; and scanning means for scanning the sample and the top end of the probe relatively to each other, wherein a top end diameter of the probe is equal to or smaller than ¼ of a wavelength of the light illuminating the probe, and where a length of a detection range of the light detection means of the probe is $z_0$, the wavelength of the illuminating light is $\lambda$, a maximum value of a diameter of the probe is $d_{max}$ within a range from the top end of the probe to the distance $z_0$, and the top end diameter of the probe is $d_0$, a diameter of the probe monotonously increases from the top end to the distance $z_0$, and $$d_{max} \leq d_0(z_0+\lambda/4)/(\lambda/4)$$

is given.

28. A near-field optical microscope comprising:

light illumination means for illuminating a sample surface of a sample with light;

a probe having a top end provided at a position near the sample surface which is illuminated with the light;

light detection means for detecting scattered light scattered by the probe; and scanning means for scanning the sample and the top end of the probe relatively to each other, wherein a top end diameter of the probe is equal to or smaller than ¼ of a wavelength of the light illuminating the probe, and where a length of a range of the probe which is illuminated with the light from the illumination means is $z_0$, the wavelength of the illuminating light is $\lambda$, the top end diameter of the probe is $d_0$, and a diameter d of the probe at a distance from the top end of the probe, z, monotonously increases from the top end of the probe to the distance $z_0$, and $$d_{max} < d_0(z+\lambda/4)/(\lambda/4)$$

is given.

29. A near-field optical microscope comprising:

light illumination means for illuminating a sample surface of a sample with light;

a probe having a top end provided at a position near the sample surface which is illuminated with the light;

light detection means for detecting scattered light scattered by the probe; and scanning means for scanning the sample and the top end of the probe relatively to each other, wherein a top end diameter of the probe is equal to or smaller than ¼ of a wavelength of the light illuminating the probe, and where a length of a detection range of the light detection means of the probe is $z_0$, the wavelength of the illuminating light is $\lambda$, the top end diameter of the probe is $d_0$, and a diameter d of the probe at a distance from the top end of the probe, z, monotonously increases from the top end of the probe to the distance $z_0$, and $$d_{max} < d_0(z+\lambda/4)/(\lambda/4)$$

is given.

* * * * *